United States Patent [19]

Ikemoto et al.

[11] Patent Number: 4,797,823
[45] Date of Patent: Jan. 10, 1989

[54] SYSTEM FOR VEHICLE BODY ROLL CONTROL PERFORMING SUSPENSION HARDNESS CONTROL

[75] Inventors: Hiroyuki Ikemoto; Nobutaka Oowa, both of Toyota; Yasutaka Hayashi; Shunichi Doi, both of Aichi, all of Japan

[73] Assignees: Toyota Jidosha Kabushiki Kaisha; Toyota Central Research & Development Laboratories, Inc., both of Aichi, Japan

[21] Appl. No.: 921,138

[22] Filed: Oct. 21, 1986

[30] Foreign Application Priority Data

Oct. 22, 1985 [JP] Japan ............................ 60-235662
Oct. 22, 1985 [JP] Japan ............................ 60-235663

[51] Int. Cl.⁴ .............................................. B60G 17/00
[52] U.S. Cl. ............................. 364/424.05; 280/707; 280/6 H
[58] Field of Search ................. 364/424, 425; 180/41; 280/707, 708, 689, 772, 6 R, 6 H, DIG. 1

[56] References Cited

U.S. PATENT DOCUMENTS

| | | | |
|---|---|---|---|
| 4,564,214 | 1/1986 | Tokunaga et al. | 280/708 |
| 4,605,244 | 8/1986 | Tanaka et al. | 280/707 |
| 4,621,832 | 11/1986 | Nakashima et al. | 364/424 |
| 4,624,476 | 11/1986 | Tanaka et al. | 280/707 |
| 4,625,993 | 12/1986 | Williams et al. | 280/6 H |
| 4,693,493 | 9/1987 | Ikemoto et al. | 280/707 |
| 4,697,237 | 9/1987 | Tanaka et al. | 280/6 H |

FOREIGN PATENT DOCUMENTS

| | | |
|---|---|---|
| 0035330 | 9/1981 | European Pat. Off. |
| 0115202 | 8/1984 | European Pat. Off. |
| 0114757 | 8/1984 | European Pat. Off. |
| 2155207 | 9/1985 | United Kingdom |
| 2155658 | 9/1985 | United Kingdom |

Primary Examiner—Gary Chin
Attorney, Agent, or Firm—Parkhurst, Oliff & Berridge

[57] ABSTRACT

In this roll control system, suspension means are provided for resiliently suspending the vehicle wheels with variable hardness/softness characteristics, each suspension means including an actuator with a pressure chamber which increases or decreases wheel suspension height according to the supply or discharge of working fluid. Working fluid supply/discharge means are provided for the actuators, to supply and discharge working fluid to and from actuator pressure chambers. The road speed, the steering angle, and the actual body roll angle are detected. Means for computing and control computes a steady state vehicle body roll angle $\phi_\infty$ from the vehicle speed and steering angle, advances the phase of a signal indicative of $\phi_\infty$ to compute a compensating roll angle value $\Phi_\infty$, and then computes a difference value $\hat{\phi}$ based upon a desired roll angle $\phi_a$, $\Phi_\infty$, and the actual roll angle $\phi_t$, according to the equation:

$$\hat{\phi} = \phi_a - (k1\Phi_\infty + k2\phi_t)$$

where k1 and k2 are positive constants. The computing and control means is adapted to control the working fluid supplying and discharging means based upon $\hat{\phi}$ when the absolute value of $\hat{\phi}$ is larger than a predetermined value $\hat{\phi}_1$, and to control the hardness/softness characteristics of the suspension means according to the absolute value of $\hat{\phi}$ when the absolute value of $\hat{\phi}$ is smaller than $\hat{\phi}_1$.

28 Claims, 10 Drawing Sheets

SYSTEM FOR VEHICLE BODY ROLL CONTROL PERFORMING SUSPENSION HARDNESS CONTROL

BACKGROUND OF THE INVENTION

The present invention relates to a roll control system for an automotive vehicle, and more specifically relates to a vehicle roll control system of the vehicle height adjustment type.

The present invention has been described in Japanese Patent Applications Serial Nos. Showa 60-235662 (1985) and Showa 60-235663 (1985), both of them filed by an applicant the same as the entity assigned or owed duty of assignment of the present patent application; and the present patent application hereby incorporates into itself by reference the tests of said Japanese Patent Applications and the claims and the drawings thereof; copies are appended to the present application.

Further, the present inventors wish hereby to attract the attention of the examining authorities to copending patent applications Ser. Nos. 921,251 (issued as U.S. Pat. No. 4,693,493 on Sept. 15, 1987), 921,450, 921,451, and 921468, which may be considered to be material to the examination of the present patent application.

In general, in the operational conditions where a vehicle such as an automobile turns at a speed not less than a particular determinate turning speed value, the body of the vehicle experiences rolling, i.e. the vehicle body inclines in the radially outward direction, and this rolling results in deterioration of the drivability of the vehicle and discomfort for the vehicle driver and/or the vehicle passengers.

As shown in Japanese Patent Laying Open Publication Serial No. 59-120509 (1984) and in the specification of Japanese Patent Application Ser. No. 59-172416, neither of which is it intended hereby to admit as prior art to the present patent application except to the extent in any case required by applicable law, as an approach to cope with the above identified problem, it has been suggested, while the vehicle is running round a curve, to increase the hardness and the softness characteristics of the suspension means for the vehicle, e.g. the damping force of the vehicle shock absorbers or the spring rate of the vehicle suspension springs. In such an approach, however, it is only possible to reduce the roll of the vehicle body to a lower level in comparison with the case in which no damping force increase or spring rate increase is performed, and it is not always possible to effectively prevent the vehicle body from rolling. Further background to this matter can be gleaned from Japanese Utility Model Laying Open Publication Serial No. 59-35105 (1984), Japanese Patent Laying Open Publication No. 53-26021 (1978), Japanese Patent Laying Open Publication Ser. No. 58-167210 (1983), and Japanese Utility Model Laying Open Publication Serial No. 56-147107 (1981), none of which is it intended hereby to admit a prior art to the present patent application except to the extent in any case required by applicable law.

In order to cope with the above problem, in the case where a vehicle is fitted with a vehicle height adjustment system comprising: a plurality of actuators which are provided for resiliently suspending the vehicle wheels from its body and are adapted to increase or decrease vehicle height at locations corresponding to the associated vehicle wheels as respective results of supplying or discharging working fluid to or from variable volume working fluid chambers of said actuators; a plurality of working fluid supplying and discharging means which are provided corresponding to the actuators and which serve to supply or discharge the working fluid to or from said actuators; a vehicle height detecting means for sensing vehicle height; a control means for controlling the working fluid supplying and discharging means based upon the data sensed by the vehicle height detecting means in order to adjust the vehicle height to a determinate vehicle height, (as proposed, for example, in the specification of Japanese Patent Laying Open Publication Serial No. Sho 60-85005 (1985), which was based upon an application filed by an applicant the same as one of the applicants or one of the assignees or one of the entities owed duty of assignment of the present application, and which it is not intended hereby to admit as prior art to the present patent application except to the extent in any case required by applicable law), it might be conceived of to actively achieve vehicle height adjustment during running of the vehicle around a curve, in order to thereby prevent completely the vehicle body from rolling, by controlling the working fluid supplying and discharging means based upon the difference between the actual vehicle height and a reference vehicle height.

In a vehicle equipped with such a vehicle height adjustment system as described above, however, since the duty ratios for controlling the various actuators for the vehicle wheels (such actuators are typically controlled by duty ratio control) would be set based upon the differences between the actual vehicle heights at its wheels and reference vehicle heights at said wheels, therefore roll control by vehicle height adjustment could only be initiated at a time point when the vehicle height differences caused due to rolling of the vehicle body had become significantly large, and accordingly the problem would arise that it would be logically impossible to cancel all of the rolling of the vehicle body, at least in a case when rapid steering was being performed.

SUMMARY OF THE INVENTION

The present invention considers the problem described above which arises in roll control through the use of the conventional vehicle height adjustment system, and has as its primary object to avoid the problem detailed above.

Another object of the present invention is the provision of an improved vehicle roll control system of vehicle height adjustment type which is adapted to predict a roll angle of the vehicle body from the vehicle speed and the steering angle, to determine an actual roll angle of the vehicle body, and, when the predicted roll angle is relatively large, to control the working fluid supplying and discharging means according to the predicted roll angle, thereby to positively prevent the vehicle body from rolling even in the case when rapid steering action is being performed; and, when the predicted roll angle is relatively small, to control the hardness and the softness characteristics of the vehicle suspension means in accordance with the predicted vehicle body roll angle and the actual vehicle body roll angle, thereby to enhance the comfortability of the vehicle while preventing the vehicle body from rolling, and, optionally, which is further adapted to reduce any rapid change in the rate of change of rolling rate of the vehicle body that might otherwise occur between roll control performed according to controlling the vehicle height and roll control performed according to controlling the hardness and softness characteristics of the vehicle suspension.

Another object of the present invention is to provide a vehicle roll control system which has, in addition to the above functions, the function of properly adjusting the vehicle height within a desired vehicle height range in the case where the vehicle is not suffering from operational conditions that cause rolling of the vehicle body to an extent greater than a determinate extent.

Yet another object of the present invention is to provide a vehicle roll control system which has, in addition to the above functions, the function of taking into account the actual degree of rolling of the vehicle body, so as to more precisely prevent such vehicle body roll.

According to a first general aspect of the present invention, these and other objects are attained by, for a vehicle comprising a body and a plurality of wheels upon which it runs, a vehicle roll control system of vehicle height adjustment type, comprising: a plurality of means, one corresponding to each one of said vehicle wheels, for resiliently suspending said vehicle wheels from the vehicle body and being controllable to vary the hardness/softness characteristic of said suspension of said vehicle wheel between at least two different hardness/softness characteristic levels including a harder characteristic level and a softer characteristic level, each said suspension means comprising an actuator assembly which has a pressure chamber and is adapted to increase or decrease the suspension height of its corresponding vehicle wheel as respective results of supplying or discharging of working fluid to or from its said pressure chamber; a plurality of working fluid supplying and discharging means which are provided corresponding to said actuator assemblies and which serve to supply working fluid to said working fluid chambers and to discharge working fluid from said working fluid chambers; a vehicle speed detecting means for sensing the read speed of the vehicle; a steering angle detecting means for sensing the steering angle of the vehicle; a means for sensing the actual roll angle $\phi_t$ of said vehicle body; and a means for computing and control, which computes a steady state roll angle $\phi_\infty$ of the vehicle body from the vehicle speed sensed by said vehicle speed detecting means and the steering angle sensed by said steering angel detecting means, advances the phase of a signal indicative of said steady state roll angle $\phi_\infty$ to thereby compute a compensating value $\phi_\infty$ of roll angle, and then computes a difference value $\hat{\phi}$ as based upon a desired roll angle $\phi_a$ of the vehicle body, said compensating value $\phi_\infty$ of roll angle, and said actual vehicle body roll angle $\phi_t$, according to the equation:

$$\hat{\phi} = \phi_a - (k1\phi_\infty + k2\phi_t)$$

where k1 and k2 are positive constants; said computing and control means being adapted to control said working fluid supplying and discharging means based upon said difference value $\hat{\phi}$ when the absolute value of said difference value $\hat{\phi}$ is larger than a first determinate value $\phi_1$, and to control the hardness/softness characteristics of said vehicle wheels suspension means according to the absolute value of said difference value $\hat{\phi}$ when the absolute value of said difference value $\hat{\phi}$ is smaller than said first determinate value $\phi_1$; and, according to a second general aspect of the present invention, these and other objects are attained by, for a vehicle comprising a body and a plurality of wheels upon which it runs, a vehicle roll control system of vehicle height adjustment type, comprising: a plurality of means one provided corresponding to each one of said vehicle wheels for resiliently suspending said one of said vehicle wheels from the vehicle body and being controllable to vary the hardness/softness characteristic of said suspension of said vehicle wheel between at least two different hardness/softness characteristic levels including a harder characteristic level and a softer characteristic level, each said suspension means comprising an actuator assembly which has a pressure chamber and is adapted to increase or decrease the suspension height of its corresponding vehicle wheel as respective results of supplying or discharging of working fluid to or from its said pressure chamber; a plurality of working fluid supplying and discharging means which are provided corresponding to said actuator assemblies and which serve to supply working fluid to said working fluid chambers and to discharge working fluid from said working fluid chambers; a plurality of vehicle height detection means which are provided corresponding to said vehicle wheels and which serve for sensing parameters representative of the suspended heights Hi of the vehicle body over said vehicle wheels; a vehicle speed detecting means for sensing the road speed of the vehicle; a steering angle detecting means for sensing the steering angle of the vehicle; a means for sensing the actual roll angle $\phi_t$ of said vehicle body; and: a means for computing and control, which computes the differences $\Delta$Hi between said vehicle heights Hi as sensed by said vehicle height detection means and reference vehicle heights, computes a steady state roll angle $\phi_\infty$ of the vehicle body from the vehicle speed sensed by said vehicle speed detecting means and the steering angle sensed by said steering angle detecting means, advances the phase of a signal indicative of said steady state roll angle $\phi_\infty$ to thereby compute a compensating value $\phi_\infty$ of roll angle, and then computes a difference value $\hat{\phi}$ as based upon a desired roll angle $\phi_a$ of the vehicle body, said compensating value $\phi_\infty$ of roll angle, and said actual vehicle body roll angle $\phi_t$, according to the equation:

$$\hat{\phi} = \phi_a - (k1\phi_\infty + k2\phi_t)$$

where k1 and k2 are positive constants; said computing and control means being adapted, when the absolute value of said difference value $\hat{\phi}$ is larger than a first determinate value $\phi_1$, to control said working fluid supplying and discharging means based upon said difference value $\hat{\phi}$, and to control said working fluid supplying and discharging means according to said vehicle height differences Hi so as to thereby adjust the absolute values of said vehicle height differences to be not more than a determinate value $\Delta$Ho, and to control the hardness/softness characteristics of said vehicle wheels suspension means according to the absolute value of said difference value $\hat{\phi}$, when the absolute value of said difference value $\hat{\phi}$ is smaller than said first determinate value $\phi_1$.

Further, according to a particular specialization of the present invention, the above specified and other objects are more particularly attained by a system for vehicle roll control of the first type specified above, wherein said computing and control means, when the absolute value of said difference value $\hat{\phi}$ is larger than said first determinate value $\phi_1$, controls said working fluid supplying and discharging means according to said difference value $\hat{\phi}$.

According to such a system as just specified, since the computing control means is adapted to compute a steady state roll angle $\phi_\infty$ of the vehicle body from the vehicle speed sensed by said vehicle speed detecting means and the steering angle sensed by said steering angle detecting means, to advance the phase of a signal indicative of said steady state roll angle $\phi_\infty$ to thereby compute a compensating value $\phi_\infty$ of roll angle, and then to compute a difference value $\hat{\phi}$ as based upon a desired roll angle $\phi_a$ of the vehicle body, said compensating value $\phi_\infty$ of roll angle, and said actual vehicle body roll angle $\phi_t$, according to the equation:

$$\hat{\phi}=\phi_a-(k1\,\phi_\infty+k2\phi_t)$$

where k1 and k2 are positive constants; and to control said working fluid supplying and discharging means according to said difference value $\hat{\phi}$ when the absolute value of said difference value $\hat{\phi}$ is larger than a first determinate value $\phi_1$, and to control the hardness/softness characteristics of said vehicle wheels suspension means according to the absolute value of said difference value $\hat{\phi}$ when the absolute value of said difference value $\hat{\phi}$ is smaller than said first determinate value $\phi_1$, it is possible previously, positively, and precisely to prevent the vehicle body from rolling even during rapid steering, as well as to enhance the comfortability of the vehicle while reducing the roll level of the vehicle body during steady state turning.

And further, according to another particular specialization of the present invention, the above specified and other objects are more particularly attained by a system for vehicle roll control of the second type specified above, again wherein said computing and control means, when the absolute value of said difference value $\hat{\phi}$ is larger than said first determinate value $\phi_1$, controls said working fluid supplying and discharging means according to said difference value $\hat{\phi}$.

According to such a system as just specified since the computing control means is adapted to compute the differences $\Delta$Hi between said vehicle heights Hi as sensed by said vehicle height detection means and reference vehicle heights, to compute a steady state roll angle $\phi_\infty$ of the vehicle body from the vehicle speed sensed by said vehicle speed detecting means and the steering angle sensed by said steering angle detecting means, to advance the phase of a signal indicative of said steady state roll angle $\phi_\infty$ to thereby compute a compensating value $\phi_\infty$ of roll angle, and then to compute a difference value $\hat{\phi}$ as based upon a desired roll angle $\phi_a$ of the vehicle body, said compensating value $\phi_\infty$ of roll angle, and said actual vehicle body roll angle $\phi_t$, according to the equation:

$$\hat{\phi}=\phi_a-(k1\,\phi_\infty+k2\phi_t)$$

where k1 and k2 are positive constants; and, when the absolute value of said difference value $\hat{\phi}$ is larger than a first determinate value $\phi_1$, to control said working fluid supplying and discharging means based upon said difference value $\hat{\phi}$, and to control said working fluid supplying and discharging means according to said vehicle height differences Hi so as to thereby adjust the absolute values of said vehicle height differences to be not more than a determinate value $\Delta$Ho, and to control the hardness/softness characteristics of said vehicle wheels suspension means according to the absolute value of said difference value $\hat{\phi}$, when the absolute value of said difference value $\hat{\phi}$ is smaller than said first determinate value $\phi_1$, it is possible to adjust the vehicle height within a desired vehicle height range while assuring good comfortability of the vehicle when the vehicle is suffering stationary or substantially straight running conditions; it is possible to assure good comfortability of the vehicle while restraining the vehicle body from rolling when the vehicle is turning under relatively moderate turning conditions; and, when the vehicle is enjoying relatively sever turning conditions, it is yet possible to control the flow rate of the working fluid supplied to or discharged from the working fluid pressure chambers at a value corresponding to the predicted roll angle and the actual roll angle, disregarding whether or not vehicle height difference and/or rolling of the vehicle body have actually occurred, to thereby previously, positively, and precisely prevent the vehicle body from rolling even during rapid steering.

According to a detailed characteristic of the present invention, in both the former and the latter constructions, said computing and control means is adapted to control the hardness/softness characteristics of said vehicle wheels suspension means to said harder characteristic level when the absolute value of said difference $\hat{\phi}$ is not larger than said first predetermined value $\phi_1$ and is larger than a second predetermined value $\phi_2$ which is smaller than said first predetermined value $\phi_1$, and to control the hardness/softness characteristics of said vehicle wheels suspension means to said softer characteristic level when the absolute value of said difference $\hat{\phi}$ is smaller than said second predetermined value $\phi_2$.

According to another detailed characteristic of the present invention, in both the former and the latter constructions, said desired roll angle $\phi_a$ is zero.

According to yet another detailed characteristic of the present invention, in both the former and the latter constructions, said computing control means comprises a memory means, and said memory means stores a relationship between vehicle speeds, steering angles, and steady state roll angles.

According to yet another detailed characteristic of the present invention, in both the former and the latter constructions, said means for sensing the actual roll angle of said vehicle body is a plurality of vehicle height detecting means for sensing the vehicle height at locations corresponding to the vehicle wheels, and said computing control means is adapted to compute both a roll angle $\phi_f$ of said vehicle body with respect to the front vehicle wheels and also a roll angle $\phi_r$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to compute as an actual roll angle $\phi_t$ the average of said two roll angles $\phi_f$ and $\phi_r$.

According to yet another detailed characteristic of the present invention, in the latter construction, said means for sensing the actual roll angle of said vehicle body is a plurality of vehicle height detecting means for sensing the vehicle height at locations corresponding to the vehicle wheels, and said computing control means is adapted to compute both a roll angle $\phi_{tf}$ of said vehicle body with respect to the front vehicle wheels and also a roll angle $\phi_{tr}$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to perform the computing of said roll angle difference, the controlling of said working fluid supplying and discharging means, and the controlling of the hardness/softness characteristics of said suspension means individually as far as the front vehicle wheels are concerned and as far as the rear vehicle wheels are concerned, based upon said two roll angles $\phi_{tf}$ and $\phi_{tr}$.

And, according to the detailed characteristic of the present invention, in both the former and the latter constructions, said determinate value $\Delta Ho$ for said vehicle height difference $\Delta Hi$ is not substantially larger than the absolute value of said vehicle height difference $\Delta Hi$ at the time when the absolute value of said roll angle difference $\hat{\phi}$ is substantially equal to said first determinate value $\phi_1$, whereby the roll angle of the vehicle body is prevented from changing abruptly at the transitional stage between the two manners of control.

Further, according to another particular specialization of the present invention, the above specified and other objects are more particularly attained by a system for vehicle roll control of the first type initially specified above, wherein said computing and control means, when the absolute value of said difference value $\hat{\phi}$ is larger than said first determinate value $\phi_1$, calculates a modified value $\hat{\phi}_s$ of said difference value $\hat{\phi}$ according to the equations:

$$\hat{\phi}s = k_a(\hat{\phi}-\phi_1) \ (\hat{\phi}>\phi_1)$$

$$\hat{\phi}s = k_4(\hat{\phi}-\phi_1) \ (\hat{\phi}<-\phi_1)$$

where k3 and k4 are positive coefficients, and controls said working fluid supplying and discharging means according to said modified value $\hat{\phi}_s$.

According to such a system as just specified, since the computing control means is adapted to compute a steady state roll angle $\phi_\infty$ of the vehicle body from the vehicle speed sensed by said vehicle speed detecting means and the steering angle sensed by said steering angle detecting means, to advance the phase of a signal indicative of said steady state roll angle $\phi_\infty$ to thereby compute a compensating value $\phi_\infty$ of roll angle, and then to compute a difference value $\hat{\phi}$ as based upon a desired roll angle $\phi_a$ of the vehicle body, said compensating value roll angle, and said actual vehicle body roll angle $\phi_t$, according to the equation:

$$\hat{\phi} = \phi_a - (k_1 \phi_\infty + k_2 \phi_t)$$

where k1 and k2 are positive constants; to calculate a modified value $\hat{\phi}_s$ of asid difference value $\hat{\phi}$ according to the equations:

$$\phi_s = k_a(\phi-\phi_1) \ (\phi>\phi_1)$$

$$\phi_s = k_4(\phi-\phi_1) \ (\phi<-\phi_1)$$

where k3 and k4 are positive coefficients, and to control said working fluid supplying and discharging means according to said modified value $\hat{\phi}_s$ when the absolute value of said difference value $\hat{\phi}$ is larger than a first determinate value $\phi_1$, and to control the harness/softness characteristics of said vehicle wheels suspension means according to the absolute value of said difference value $\hat{\phi}$ when the absolute value of said difference value $\hat{\phi}$ is smaller than said first determinate value $\phi_1$, it is therefore possible previously, positively, and precisely to prevent the vehicle body from rolling even during rapid steering, as well as to enhance the comfortability of the vehicle while reducing the roll level of the vehicle body during straight forward running or during steady state turning, and, as described hereinbelow in detail, it is yet possible to reduce rapid change in the roll changing rate of the vehicle body during the transitional stage between roll control which is being performed by vehicle height adjustment and roll control which is being performed by altering the hardness/softness characteristics of the vehicle suspension, to thereby eliminate the possibility that the drivers and/or the passengers in the vehicle should experience any uneasiness or discomfort.

And further, according to another particular specialization of the present invention, the above specified and other objects are more particularly attained by a system for vehicle roll control of the second type initially specified above, wherein said computing and control means, when the absolute value of said difference value $\hat{\phi}$ is larger than said first determinate value $\phi_1$, calculates a modified value $\hat{\phi}_s$ of said difference value $\hat{\phi}$ according to the equations:

$$\hat{\phi}s = k_3(\hat{\phi}-\phi_1) \ (\hat{\phi}>\phi_1)$$

$$\hat{\phi}s = k_4(\hat{\phi}-\phi_1) \ (\hat{\phi}<-\phi_1)$$

where k3 and k4 are positive coefficients, and controls said working fluid supplying and discharging means according to said modified value $\hat{\phi}_s$.

According to such a system as just specified, since the computing control means is adapted to compute a steady state roll angle $\phi_\infty$ from the vehicle speed and the steering angle, to advance the phase of a signal indicative of said steady state roll angle $\phi_\infty$ to thereby compute a compensating value $\phi_\infty$ of roll angle, to compute the difference $\hat{\phi}$ between the desired roll angle $\phi_a$ of the vehicle body, the compensating value $\phi_\infty$, and said actual roll angle $\phi_t$ following the equation:

$$\hat{\phi} = \phi_a - (k_1 \phi_\infty + k_2 \phi_t)$$

where k1 and k2 are positive constants, to calculate a modified value $\hat{\phi}_s$ of said difference value $\hat{\phi}$ according to the equations:

$$\hat{\phi}s = k_3(\hat{\phi}-\phi_1) \ (\hat{\phi}>\phi_1)$$

$$\hat{\phi}s = k_4(\hat{\phi}-\phi_1) \ (\hat{\phi}<-\phi_1)$$

where k3 and k4 are positive coefficients, and to control said working fluid supplying and discharging means according to said modified value $\hat{\phi}_s$ when the absolute value of the difference $\hat{\phi}$ is larger than a first determinate value $\phi_1$, and to control the working fluid supplying and discharging means according to the vehicle height difference $\Delta Hi$ when the absolute value of the difference $\hat{\phi}$ is not larger than the first determinate value $\phi_1$, therefore it is possible to adjust the vehicle height within a desired vehicle height range while assuring good comfortability of the vehicle, when the vehicle is enjoying the stationary or the substantially straight running condition; it is yet possible to adjust the vehicle height within a desired vehicle height range and to prevent the vehicle body from rolling in a higher level by controlling the working fluid supplying and discharging means according to the vehicle height difference when the vehicle is in the operational condition of turning in a steady state; it is yet further possible to control the flow rate of the working fluid supplied to or discharged from the working fluid chamber at a value corresponding to the predicted roll angle disregarding whether or not vehicle height difference and/or rolling of the vehicle body have actually occurred, to thereby previously and positively prevent the vehicle body from rolling even during rapid steering, and, as described hereinbelow in detail, it is yet possible to reduce any rapid change in roll change rate of the vehicle body during a transitional stage from roll control which is being performed by vehicle height adjustment and roll control which is being performed by rolling the hardness/softness characteristics of the vehicle suspension means, to thereby eliminate the possibility that the driver and/or the passengers in the vehicle might experience any uneasiness or discomfort.

According to a detailed characteristic of the present invention, in both the former and the latter constructions, said computing and control means is adapted to control the hardness/softness characteristics of said vehicle wheels suspension means to said harder characteristic level when the absolute value of said difference $\phi$ is not larger than said first predetermined value $\phi_1$ and is larger than a second predetermined value $\phi_2$ which is smaller than said first predetermined value $\phi_1$, and to control the hardness/softness characteristics of said vehicle wheels suspension means to said softer characteristic level when the absolute value of said difference $\phi$ is smaller than said second predetermined value $\phi_2$.

According to a detailed characteristic of the present invention, in both the former and the latter constructions, said desired roll angle $\phi_a$ is zero.

And, according to another detailed characteristic of the present invention, in both the former and the latter constructions, said computing control means comprises a memory means, and said memory means stores a relationship between vehicle speeds, steering angles, and steady state roll angles.

According to yet another detailed characteristic of the present invention, in both the former and the latter constructions, said means for sensing the actual roll angle of said vehicle body is a plurality of vehicle height detecting means for sensing the vehicle height at locations corresponding to the vehicle wheels, and said computing control means is adapted to compute both a roll angle $\phi_f$ of said vehicle body with respect to the front vehicle wheels and also a roll angle $\phi_r$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to compute as an actual roll angle $\phi_t$ the average of said two roll angles $\phi_f$ and $\phi_r$.

According to yet another detailed characteristic of the present invention, in both the former and the latter constructions, said means for sensing the actual roll angle of said vehicle body is a plurality of vehicle height detecting means for sensing the vehicle height at locations corresponding to the vehicle wheels, and said computing control means is adapted to compute both a roll angle $\phi_{tf}$ of said vehicle body with respect to the front vehicle wheels and also a roll angle $\phi_{tr}$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to perform the computing of said roll angle difference, the controlling of said working fluid supplying and discharging means, and the controlling of the hardness/softness characteristics of said suspension means individually as far as the front vehicle wheels are concerned and as far as the rear vehicle wheels are concerned, based upon said two roll angles $\phi_{tf}$ and $\phi_{tr}$.

And, according to a final further detailed characteristic of the present invention, in both the former and the latter constructions, said determinate value $\Delta Ho$ for said vehicle height difference $\Delta Hi$ is not substantially larger than the absolute value of said vehicle height difference $\Delta Hi$ at the time when the absolute value of said roll angle difference $\phi$ is substantially equal to said first determinate value $\phi_1$; whereby the roll angle of the vehicle body is inhibited from changing abruptly during a transitional stage from roll control which is being performed by vehicle height adjustment and roll control which is being performed by controlling the hardness/softness characteristics of the vehicle suspension means.

THEORETICAL BACKGROUND

Next, the principles of the roll control according to various aspects of the present invention will be described prior to the description of the preferred embodiments of the present invention.

First, the movement of a vehicle can be expressed in the following movement equations with respect to the three movements, i.e. the lateral translation w, the yaw movement r, and the rolling movement $\phi$:

$$\Sigma M \dot{u} = \Sigma M(-Vr + g\phi) + \sum_{i=1}^{4} Fsi \quad (1)$$

$$\Sigma Iz \dot{r} = \Sigma N\psi \quad (2)$$

$$Ix\ddot{\phi} = 2(MufZf + MurZr)(\dot{u} + Vr - g\phi) + \Sigma N\phi \quad (3)$$

where:
$\Sigma M$ is the total weight of the vehicle;
Muf is the sprung mass for the front wheels;
Mur is the sprung mass for the rear wheels;
Zf is the vertical distance from the center of gravity of the vehicle to the rotational axis of the front wheels;
Zr is the vertical distance from the center of gravity of the vehicle to the rotational axis of the rear wheels;
V is the vehicle speed;
Fsi is the side force;
r is the yaw rate;
$\phi$ is the roll angle;
Iz is the yaw moment of inertia;
Ix is the roll moment of inertia;
N$\phi$ is the yaw moment;
N$\phi$ is the roll moment;
g is the acceleration due to gravity; and
u is the lateral translation speed.

Further, from the equations (1) through (3), a steady state movement of the vehicle is assumed with respect to the case where the vehicle speed is V and the steering angle is $\delta$. The steady state movement of a simple vehicle model is expressed in the following equations with respect to the lateral translation, the yaw movement, and the rolling movement:

$$\Sigma M V r + 2 C s f \frac{u + A f \cdot r}{V} + 2 C s r \frac{u - A r \cdot r}{V} = 2 C s f \delta \quad (1')$$

$$2 A f C s f \frac{u + A f \cdot r}{V} - 2 A r C s r \frac{u - A r \cdot r}{V} = 2 A f C s f \delta \quad (2')$$

$$2 Z f C s f \frac{u + A f \cdot r}{V} + 2 Z r C s r \frac{u - A r \cdot r}{V} + K \phi = 2 Z f C s f \delta \quad (3')$$

where:

$$K = \frac{Tf}{2}\left(K f T f + 2 \frac{R f}{T f}\right) + \frac{Tr}{2}\left(K r T r + 2 \frac{R r}{T r}\right)$$

Csf is the cornering power in the front wheels;
Csr is the cornering power in the rear wheels;
Af is the horizontal distance from the center of gravity of the vehicle to the rotational axis of the front wheels;
Ar is the horizontal distance from the center of gravity of the vehicle to the rotational axis of the rear wheels;
Tf is the tread of the front wheels;
Tr is the tread of the rear wheels;
Rf is the rigidity of the stabilizer for the front wheels;
Rr is the rigidity of the stabilizer for the rear wheels;
Kf is the spring rate of the suspension springs for the front wheels; and
Kr is the spring rate of the suspension springs for the rear wheels;

The above equations (1') through (3') can be rewritten as follows:

$$2 \frac{C s f + C s r}{V} \cdot u + \frac{\Sigma M \cdot V^2 + 2(A f C s f - A r C s r)}{V} \cdot r = 2 C s f \delta \quad (4)$$

$$2 \frac{A f C s f - A r C s r}{V} \cdot u + 2 \frac{A f^2 C s f + A r^2 C s r}{V} \cdot r = 2 A f C s f \delta \quad (5)$$

$$2 \frac{Z f C s f + Z r C s r}{V} \cdot u + 2 \frac{A f Z f C s f - A r Z r C s r}{V} \cdot r + \quad (6)$$
$$K \phi = 2 Z r C s f \delta$$

The above equations (4) through (6) can be expressed in matrix form as follows:

$$\begin{pmatrix} a_{11} & a_{12} & 0 \\ a_{21} & a_{22} & 0 \\ a_{31} & a_{32} & a_{33} \end{pmatrix} \begin{pmatrix} u \\ r \\ \phi \end{pmatrix} = \begin{pmatrix} b_1 \\ b_2 \\ b_3 \end{pmatrix} \quad (7)$$

Now, by making replacement as follows and applying the Cramer's formula, a predicted steady state roll angle $\phi_\infty$ of the vehicle may be expressed as follows:

$$D = \begin{pmatrix} a_{11} & a_{12} & 0 \\ a_{21} & a_{22} & 0 \\ a_{31} & a_{32} & a_{33} \end{pmatrix} D_\infty = \begin{pmatrix} a_{11} & a_{12} & b_1 \\ a_{21} & a_{22} & b_2 \\ a_{31} & a_{32} & b_3 \end{pmatrix} \quad (8)$$

$$\phi_\infty = D_\infty / D \quad (9)$$

Thus, as shown in FIG. 5, from the relationship defined by the equation (9) a graph may be obtained which shows the relationship between the vehicle speed V, the steering angle δ, and the steady state roll angle $\phi_\infty$.

As will be seen, by predicting the steady state roll angles $\phi_\infty$ corresponding to the vehicle speed V and each instantaneous value of steering angle which varies gradually at each instantaneous vehicle speed V, by advancing the phase of a signal indicative of the steady state roll angle to thereby compute a compensating value $\phi_\infty$ of roll angle, and by computing the difference $\hat{\phi}$ based upon the desired roll angle $\phi_a$ the compensating value $\phi_\infty$, and the actual roll angle $\phi_t$ following the equation:

$$\hat{\phi} = \phi_a - (k_1 \phi_\infty + k_2 \phi_t)$$

where k1 and k2 are positive constants, and, when the absolute value of the difference $\hat{\phi}$ is relatively large, by controlling the working fluid supplying and discharging means incorporated in the vehicle height adjustment system according to the difference $\hat{\phi}$ between the desired roll angle $\phi_a$ and the steady state roll angle $\phi_\infty$, it is possible to compensate for the time lag in roll control during the transitional state from the condition where the vehicle is running at steering angle of zero to the condition where it is turning at steering angle of a maximum value, to thereby prevent previously and positively the vehicle body from rolling during such transitional periods; and, when the absolute value of the difference is relatively small wherein the actual roll level of the vehicle body is also relatively small, by controlling the hardness and the softness characteristics of the suspension means in accordance with the difference $\hat{\phi}$, it is possible to reduce the rolling of the vehicle body while assuring good comfortability of the vehicle.

In this connection, when the absolute value of the roll angle difference is relatively large, by carrying out a calculation of the so called threshold filter type on the roll angle difference $\hat{\phi}$ following the equations:

$$\hat{\phi}s = k_3(\hat{\phi} - \phi_1) \quad (\hat{\phi} > \phi_1)$$

$$\hat{\phi}s = k_4(\hat{\phi} - \phi_1) \quad (\hat{\phi} < -\phi_1)$$

where k3 and k4 are positive coefficients, to determine a modified value of the roll angle difference, and, in particular, when the absolute value of the difference $\hat{\phi}$ exceeds $\phi_1$, by controlling the suspension actuators according to the modified value $\hat{\phi}_s$ of the roll angle difference, as will be described hereinbelow in detail, it is possible to reduce any rapid change in the rate of change of the actual roll angle of the vehicle body, during a transitional stage between the mode of roll control performed by controlling the hardness and softness characteristics of the suspension and the mode of roll control performed by controlling the suspension actuators.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments.

DESCRIPTION OF THE PREFERRED EMBODIMENTS

Figure 1:
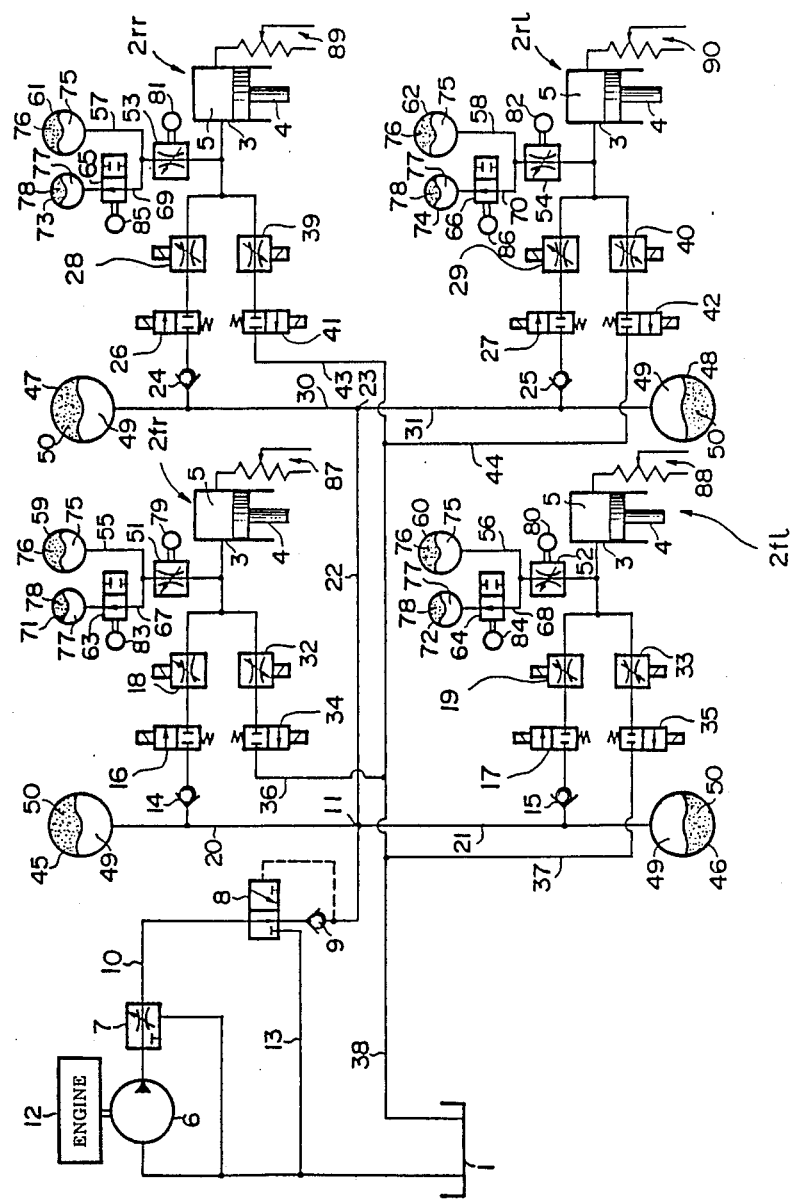
FIG. 1 is a schematic diagram showing major physical components of either of the two preferred embodiments of the system for roll control for an automotive vehicle of the present invention which will be described.
Figure 2:
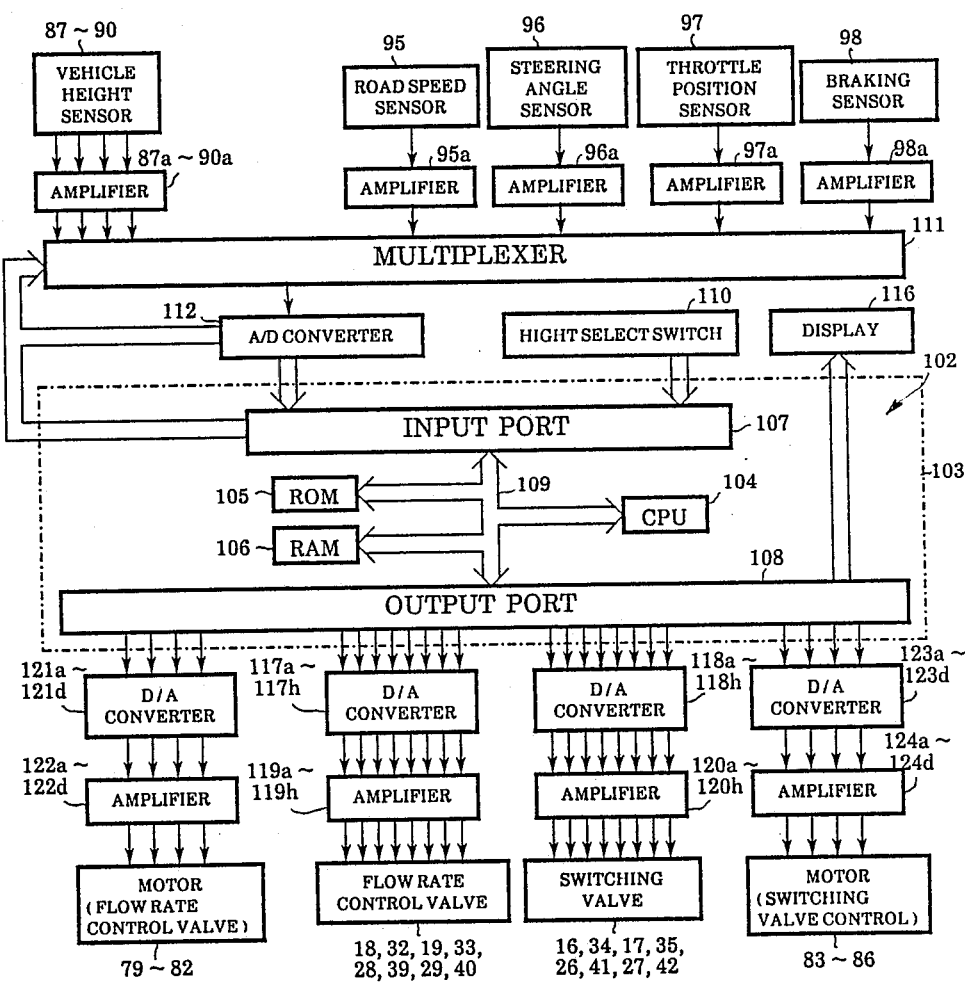
FIG. 2 is a block diagrammatical view showing the internal construction of an electrical control device, of a type incorporated in either of said two preferred embodiments of the system for roll control for an automotive vehicle of the present invention, incorporating a micro computer.

The present invention will now be described with reference to the preferred embodiments thereof, and with reference to the figures. The overall construction of the suspension system incorporated in both of the two preferred embodiments of the system for roll control for an automotive vehicles of the present invention which will be described is the same, only the control programs which control the operation of a micro computer incorporated therein being different. FIG. 1, therefore, is a schematic diagram showing major physical components of both of said preferred embodiments of the system for automotive vehicle roll control of the present invention, and FIG. 2 is a block diagrammatical view showing the internal construction of an electrical control device incorporating a micro computer, incorporated in both of said preferred embodiments.

OVERALL SUSPENSION SYSTEM CONSTRUCTION

Referring first to FIG. 1 which shows the gross mechanical components incorporated in the vehicle roll control system of the present invention that are utilized for vehicle height and ride adjustment, in this figure the reference numeral 1 denotes a suspension working fluid reservoir or sump, while 2fl, 2fr, 2rl, and 2rr are actuator assemblies which are provided to, respectively the front left vehicle wheel, the front right vehicle wheel, the rear left vehicle wheel, and the rear right vehicle wheel; none of these vehicle wheels is particularly shown in any of the figures. And, in and for each of said actuator assemblies 2fl, 2fr, 2rl, and 2rr, the reference numeral 3 denotes a cylinder and the reference numeral 4 denotes a piston sliding in said cylinder and cooperating with a closed end thereof to define an actuating pressure chamber 5. Each of said vehicle wheels is rotationally mounted about a substantially horizontal axis to a member such as a suspension arm (not shown) or the like which is suspended from the body (also not shown) of the vehicle by means of a flexible linkage of some per se known sort, and each of said actuator assemblies 2fl, 2fr, 2rl, and 2rr is arranged to have one of its cylinder 3 and its piston 4 drivingly coupled to one of said vehicle body and said suspension arm, while the other of its said cylinder 3 and said piston 4 is drivingly coupled to the other of said vehicle body and said suspension arm. Thus, by pressurization by suspension working fluid (abbreviated hereinafter merely as "fluid") of the pressure chamber 5 defined by said cylinder 3 and said piston 4, each of said actuator assemblies 2fl, 2fr, 2rl, and 2rr serves for maintaining and adjusting the sprung height from the road surface of the portion of the vehicle body above its associated vehicle wheel, and for determining the characteristics of the springing of its said associated vehicle wheel. In other possible embodiments of the vehicle roll control system of the present invention, other constructions would be possible for these actuator assemblies 2fl, 2fr, 2rl, and 2rr, as long as each was capable of increasing and decreasing the sprung height of the portion of the vehicle body above its associated vehicle wheel, corresponding to the supply and the discharge of fluid to a working fluid chamber thereof, and as long as the pressure in the working fluid chamber increased and decreased in response respectively to bound and rebound of said associated vehicle wheel.

Fluid is sucked up from the reservoir 1 by a fluid pump 6 rotationally driven by the engine 12 of the vehicle to which this suspension system is fitted, and a pressurized supply thereof is fed via a conduit 10 through, in order, a flow rate control valve 7, a load mitigating valve 8, and a one way check valve 9 to a conduit junction point 11, and thence via another conduit 22 said pressurized fluid is fed to another conduit junction point 23. This flow rate control valve 7 is constructed so as to control the flow rate of fluid in the conduit 10 according to a signal which it receives. The load mitigating valve 8 is constructed so as to be responsive to the pressure in the conduit 10 downstream of the one way check valve 9 and so as to vent a certain amount of the pressurized fluid in said conduit 10 via a conduit 13 back to a point in the conduit 10 upstream of the pump 6, so as to maintain said pressure in the conduit 10 downstream of the one way check valve 9 at no more than a determinate pressure value. And the check valve 9 prevents the fluid from flowing backwards through the conduit 10 from the conduit junction points 11 and 23 towards the load mitigating valve 8.

The conduit junction point 11 is connected to the cylinder chamber 5 of the actuator 2fr for the front right vehicle wheel via a conduit 20 at intermediate points along which there are provided, in order, a one way check valve 14, an electrically controlled ON/OFF switching valve 16, and an electrically controlled flow rate control valve 18. Similarly, said conduit junction point 11 is connected to the cylinder chamber 5 of the actuator 2fl for the front left vehicle wheel via a conduit 21 at intermediate points along which there are provided, in order, a one way check valve 15, an electrically controlled O/OFF switching valve 17, and an electrically controlled flow rate control valve 19. The other conduit junction point 23 is connected to the cylinder chamber 5 of the actuator 2rr for the rear right vehicle wheel via a conduit 30 at intermediate points along which there ar provided, in order, a one way check valve 24, an electrically controlled ON/OFF switching valve 26, and an electrically controlled flow rate control valve 28. Similarly, said other conduit junction point 23 is connected to the cylinder chamber 6 of the actuator 2rl for the rear left vehicle wheel via a conduit 31 at intermediate points along which there are provided, in order, a one way check valve 25, an electrically controlled ON/OFF switching valve 27, and an electrically controlled flow rate control valve 29. Thus, the cylinder chambers 5 for the actuators 2fr, 2fl, 2rr, and 2rl are selectively supplied with pressurized fluid from the reservoir 1 via the conduits 10, 20 and 21, 22, and 30 and 31 with, as will be described in detail hereinbelow, such supply of pressurized fluid and the flow rate thereof being appropriately and properly controlled by the supply of electrical energy to the electrically controlled ON/OFF switching valves 16, 17, 26, and 27 and to the electrically controlled flow rate control valves 18, 19, 28, and 29.

To a point of the conduit 20 between the electrically controlled flow rate control valve 18 and the cylinder chamber 5 of the actuator 2fr for the front right vehicle wheel there is communicated one end of a conduit 36, the other end of which is connected to a drain conduit 38. At intermediate points on said conduit 36 there are provided an electrically controlled flow rate control valve 32 and an electrically controlled ON/OFF switching valve 34. Similarly, to a point of the conduit 21 between the electrically controlled flow rate control valve 19 and the cylinder chamber 5 of the actuator 2fl for the front left vehicle there is communicated one end of a conduit 37, the other end of which is connected to said drain conduit 38, and at intermediate points on said conduit 37 there are provided an electrically controlled flow rate control valve 33 and an electrically controlled ON/OFF switching valve 35. And to a point of the conduit 30 between the electrically controlled flow rate control valve 28 and the cylinder chamber 5 of the actuator 2rr for the rear right vehicle wheel there is communicated one end of a conduit 43, the other end of which is connected to the drain conduit 38, and at intermediate points on said conduit 43 there are provided an electrically controlled flow rate control valve 39 and an electrically controlled ON/OFF switching valve 41, while also to a point of the conduit 31 between the electrically controlled flow rate control valve 29 and the cylinder chamber 5 of the actuator 2rl for the rear left vehicle wheel there is communicated one end of a conduit 44, the other end of which is connected to said drain conduit 38, and at intermediate points on said conduit 44 there are provided an electrically controlled flow rate control valve 40 and an electrically controlled ON/OFF switching valve 42. Thus, the cylinder chambers 5 for the actuators 2fr, 2fl, 2rr, and 2rl are selectively exhausted of pressurized fluid to the reservoir 1 via the conduits 36, 37, 43, 44, and 38, with, as will be described in detail hereinbelow, such exhausting of pressurized fluid and the flow rate thereof being appropriately and properly controlled by the supply of electrical energy to the electrically controlled ON/OFF switching valves 34, 35, 41, and 42 and to the electrically controlled flow rate control valves 32, 33, 39, and 40.

In this shown construction, although such constructional details should be understood as not being limitative of the present invention, the electrically controlled ON/OFF switching valves 16, 17, 26, 27, 34, 35, 41, and 42 are constructed as normally closed switching valves incorporating such devices as solenoids (not particularly shown), and, when no actuating electrical energy is supplied to the coil (not shown either) of one of said solenoids, the respective one of said switching valves 16, 17, 26, 27, 34, 35, 41, and 42 is closed as schematically shown in the figure so as to intercept and to prevent flow of fluid in the conduit to which said switching valve is fitted, while on the other hand, when actuating electrical energy is supplied to said coil of said one of said solenoids, said respective one of said switching valves 16, 17, 26, 27, 34, 35, 41, and 42 is opened as also schematically shown in the figure so as to allow flow of fluid in said conduit to which said switching valve is fitted. Also, the electrically controlled flow rate control valves 18, 19, 28, 29, 32, 33, 39, and 40 are constructed so as to vary the degree of restriction which they apply according to the duty ratio of the current or the voltage of actuating pulse electrical signals which they receive so as to thereby control the flow rate of fluid flowing through the conduits 20, 21, 30, 31, 36, 37, 43, and 44 respectively associated with said flow rate control valves.

To a point on the conduit 20 intermediate between the junction point 11 and the one way check valve 14, i.e. upstream of said one way check valve 14, there is connected an accumulator 45 which has a fluid chamber 49 and an air chamber 50 which are separated from one another by a diaphragm. This accumulator 45 serves to absorb fluctuations in pressure set up in the conduit 10 due to pulsations in the fluid supply provided by the pump 6 and due to the action of the load mitigating valve 8, and to accumulate pressure for the fluid in the conduit 20. Similarly, to a point on the conduit 21 intermediate between the junction point 11 and the one way check valve 15, i.e. upstream of said one way check valve 15, there is connected an accumulator 46 which has a fluid chamber 49 and an air chamber 50 which are separated from one another by a diaphragm. This accumulator 46 similarly serves to absorb fluctuations in pressure set up in the conduit 10 due to pulsations in the fluid supply provided by the pump 6 and due to the action of the load mitigating valve 8, and to accumulate pressure for the fluid in the conduit 21. And, likewise, to a point on the conduit 30 intermediate between the junction point 11 and the one way check valve 24, i.e. upstream of said one way check valve 24, there is connected an accumulator 47 which has a fluid chamber 49 and an air chamber 50 which are separated from one another by a diaphragm, and this accumulator 47 serves to absorb fluctuations in pressure set up in the conduit 22 due to pulsations in the fluid supply provided by the pump 6 and due to the action of the load mitigating valve 8, and to accumulate pressure for the fluid in the conduit 30; while, similarly, to a point on the conduit 31 intermediate between the junction point 11 and the one way check valve 25, i.e. upstream of said one way check valve 25, there is connected an accumulator 48 which has a fluid chamber 49 and an air chamber 50 which are separated from one another by a diaphragm; and this accumulator 48 similarly serves to absorb fluctuations in pressure set up in the conduit 22 due to pulsations in the fluid supply provided by the pump 6 and due to the action of the load mitigating valve 8, and to accumulate pressure for the fluid in the conduit 31.

To another point on the conduit 20 intermediate between the electrically controlled flow rate control valve 18 and the actuator 2fr for the front right vehicle wheel there is connected one end of a conduit 55, to the other end of which there is connected a main spring 59 which has a fluid chamber 75 and an air chamber 76 which are separated from one another by a diaphragm. At an intermediate point of said conduit 55 there is fitted a flow rate control valve 51 controlled by an electrically operated motor 79. And to a point on said conduit 55 between said flow rate control valve 51 and said main spring 59 there is connected one end of a conduit 67, to the other end of which there is connected a subspring 71 which has a fluid chamber 77 and an air chamber 78 which are separated from one another by a diaphragm. At an intermediate point of said conduit 67 there is fitted a normally open type ON/OFF switching valve 63 controlled by an electrically operated motor 83. Thus, as the volume of the cylinder chamber 5 of this actuator 2fr for the front right vehicle wheel varies in response to the bound and the rebound of said front right vehicle wheel, the fluid in said cylinder chamber 5 and in the fluid chambers 75 and 77 of this main spring 59 and this subspring 71 flows to and fro therebetween through the flow rate control valve 51, and the flow resistance caused thereby produces a vibration damping effect. Similarly, to a point on the conduit 21 intermediate between the electrically controlled flow rate control valve 19 and the actuator 2fl for the front left vehicle wheel there is connected one end of a conduit 56, to the other end of which there is connected a main spring 60 which has a fluid chamber 75 and an air chamber 76 which are separated from one another by a diaphragm, and at an intermediate point of said conduit 56 there is fitted a flow rate control valve 52 controlled by an electrically operated motor 80. And to a point of said conduit 56 between said flow rate control valve 52 and said main spring 60 there is connected one end of a conduit 68, to the other end of which there is connected a subspring 72 which has a fluid chamber 77 and an air chamber 78 which are separated from one another by a diaphragm. At an intermediate point of said conduit 68 there is fitted a normally open type ON/OFF switching valve 64 controlled by an electrically operated motor 84. Thus, as the volume of the cylinder chamber 5 of this actuator 2fl for the front left vehicle wheel varies in response to the bound and the rebound of said front left vehicle wheel, the fluid in said cylinder chamber 5 and in the fluid chambers 75 and 77 of this main spring 60 and this subspring 72 similarly flows to and fro therebetween through the flow rate control valve 52, and the flow resistance caused thereby similarly produces a vibration damping effect. And, with relation to the rear suspension for the vehicle, to a point on the conduit 30 intermediate between the electrically controlled flow rate control valve 28 and the actuator 3fr for the rear right vehicle wheel there is similarly connected one end of a conduit 57, to the other end of which there is connected a main spring 61 which likewise has a fluid chamber 75 and an air chamber 76 which are separated from one another by a diaphragm. At an intermediate point of said conduit 57 there is fitted a flow rate control valve 53 controlled by an electrically operated motor 81, and to a point on said conduit 57 between said flow rate control valve 53 and said main spring 61 there is connected one end of a conduit 69, to the other end of which there is connected a subspring 73 which also has a fluid chamber 77 and an air chamber 78 which are separated from one another by a diaphragm. And at an intermediate point of said conduit 69 there is likewise fitted a normally open type ON/OFF switching valve 65 controlled by an electrically operated motor 85. Thus, as the volume of the cylinder chamber 5 of this actuator 2fr for the rear right vehicle wheel varies in response to the bound and the rebound of said rear right vehicle wheel, the fluid in said cylinder chamber 5 and in the fluid chambers 75 and 77 of this main spring 61 and this subspring 73 flows to and fro therebetween through the flow rate control valve 53, and the flow resistance caused thereby likewise produces a vibration damping effect. Similarly, to a point on the conduit 31 intermediate between the electrically controlled flow rate control valve 29 and the actuator 2fl for the rear left vehicle wheel there is connected one end of a conduit 58, to the other end of which there is connect a main spring 62 which likewise has a fluid chamber 75 and an air chamber 76 which are separated from one another by a diaphragm, and at an intermediate point of said conduit 58 there is fitted a flow rate control valve 54 controlled by an electrically operated motor 82. And to a point on said conduit 58 between said flow rate control valve 54 and said main spring 62 there is connected one end of a conduit 70, to the other end of which there is connected a subspring 74 which has a fluid chamber 77 and an air chamber 78 which are separated from one another by a diaphragm. At an intermediate point of said conduit 70 there is fitted a similar normally open type ON/OFF switching valve 66 controlled by an electrically operated motor 86. Thus, as the volume of the cylinder chamber 5 of this actuator 2fl for the rear left vehicle wheel varies in response to the bound and the rebound of said rear left vehicle wheel, the fluid in said cylinder chamber 5 and in the fluid chambers 75 and 77 of this main spring 62 and this subspring 74 similarly flows to and fro therebetween through the flow rate control valve 54, and the flow resistance caused thereby similarly produces a vibration damping effect.

As will be particularly explained hereinafter, in these preferred embodiments of the vehicle roll control system of the present invention, the damping effect C for the four vehicle wheels is arranged to be switched between three levels—high, medium, and low—according to control of the flow resistance of the flow rate control valves 51, 52, 53, and 54 by the associated respective electric motors 79, 80, 81, and 82. Also, the springing effect, i.e. the modulus of elasticity of springing, or the four vehicle wheels is arranged to be switched between two levels—high and low—according to control of the opening and closing of the ON/OFF switching valves 63, 64, 65, and 66 by the associated respective electric motors 83, 84, 85, and 86. And, as will be described shortly, the electric motors 79, 80, 81, and 82 and the electric motors 83, 84, 85, and 86 are selectively energized and controlled by an electrical control device 102, according to signals which said electrical control device 102 receives from a vehicle speed sensor 95, a steering angle sensor 96, a throttle position sensor 97, and a braking sensor 98, so as to minimize nose dive, squat, and roll of the vehicle. Furthermore, vehicle height sensors 87, 88, 89, and 90 are provided respectively to the actuator 2fr for the front right vehicle wheel, the actuator 2fl for the front left vehicle wheel, the actuator 2rr for the rear right vehicle wheel, and the actuator 2rl for the rear left vehicle wheel, each functioning so as to sense the displacement of the piston 4 of its associated actuator (or of the suspension arm associated therewith, not particularly shown) so as to produce an electrical output signal representative thereof, i.e. representative of the height of the generally corresponding portion of the vehicle body from the road surface; these electrical output signals are fed to the electrical control device 102.

THE CONSTRUCTION OF THE ELECTRICAL CONTROL DEVICE 102

Referring now particularly to FIG. 2, the construction of the electrical control device 102 and of the micro computer designated as 103 incorporated therein will be explained. This micro computer 103 may, as suggested in FIG. 2, be of per se conventional construction, and in such an exemplary case incorporates a CPU (central processing unit) 104, a ROM (read only memory) 105, a RAM (random access memory) 106, an input port device 107, and an output port device 108, all of these elements being linked together by way of a two way common bus 109.

A vehicle height selection switch 110 is provided in the passenger compartment of the vehicle, capable of being accessed by the vehicle driver. This vehicle height selection switch 110 is settable to any one of three positions, said three positions indicating that the driver desires the vehicle height to be either high (H), normal (N), or low (L); and said vehicle height selection switch 110 outputs a signal representative of its setting to the input port device 107 and thus to the micro computer 103. The input port device 107 is also supplied, via a multiplexer 111 and an A/D converter 112, with signals representative of the actual current vehicle heights, designated hereinafter as Hfr, Hfl, Hrr, and Hrl, over the four vehicle wheels outputted by the aforementioned four vehicle height sensors 87, 88, 89, and 90 respectively therefor and amplified by respective amplifiers 87a, 88a, 89a, and 90a, and with a signal representative of the vehicle road speed V outputted from the vehicle speed sensor 95 and amplified by an amplifier 95a, with a signal representative of the steering angle δ (considering turning to the right as positive) outputted from the steering angle sensor 96 and amplified by an amplifier 96a, with a signal representative of the throttle opening outputted by the throttle position sensor 97 and amplified by an an amplifier 97a, and with a signal representative of whether or not the braking system or systems of the vehicle is being operated outputted by the braking sensor 98 and amplified by an amplifier 98a.

In the ROM 105 there are stored reference vehicle heights Hhf and Hhr, Hnf and Hnr, and Hlf and Hlr. Hhf and Hhr are respectively the desired vehicle body heights over the front wheels and over the rear wheels when the vehicle height selection switch 110 is set to high (H); Hnf and Hnr are respectively the desired vehicle body heights over the front wheels and over the rear wheels when the vehicle height selection switch 110 is set to normal (N); and Hlf and Hlr are respectively the desired vehicle body heights over the front wheels and over the rear wheels when the vehicle height selection switch 110 is set to low (L). Thus Hhf>Hnf>Hlf and also Hhr>Hnr>Hlr. Also in the ROM 105 there are stored values representing maps corresponding to the graphs shown in FIGS. 5 through 7 which will be described hereinafter, as well as other constant values. The CPU 104 performs various calculations as will be described shortly, and based upon the results thereof selectively outputs control signals through the output port device 108 for controlling the drive motors 79 through 82 for the respective flow rate control valves 51 through 54 via respective D/A converters 121a through 121d and via respective amplifiers 122a through 122d, for controlling the flow rate control valves 18, 32, 19, 33, 28, 39, 29, and 40 via respective D/A converters 117a through 117d and via respective amplifiers 119a through 119d, for controlling the ON/OFF switching valves 16, 43, 17, 35, 26, 41, 27, and 42 via respective D/A converters 118a through 118d and via respective amplifiers 120a through 120d, and for controlling the drive motors 83 through 86 for the respective ON/OFF switching valves 63 through 66 via respective D/A converters 123a through 123d and via respective amplifiers 124a through 124d. Further, to the output port device 108 there is connected a display unit 116 which indicates to the vehicle driver whether the desired vehicle height set by said driver on the vehicle height selection switch 110 is currently high (H), normal (N), or low (L). This display unit 116 also indicates to the vehicle driver whether the damping effect control mode set by said driver on a damping effect control mode selection switch, not particularly shown but whose output is also fed to the micro computer 103 via the input port device 107 in the same way as is the output of the vehicle height selection switch 110, is currently (a) a manual normal mode (MN) in which the damping effect for the suspension system is fixedly adjusted to low (normal), (b) a manual sports mode (MS) in which the damping effect for the suspension system is fixedly adjusted to medium (sports), (c) an auto normal base mode (ANB) in which the damping effect for the suspension system is automatically adjustment to low (soft) or to high (hard) in accordance with the current values of various operational parameters of the vehicle, or (d) an auto sports base mode (ASB) in which the damping effect for the suspension system is automatically adjusted to medium or to high (hard) in accordance with the current values of various operational parameters of the vehicle.

THE FIRST PREFERRED EMBODIMENT

Figure 3:
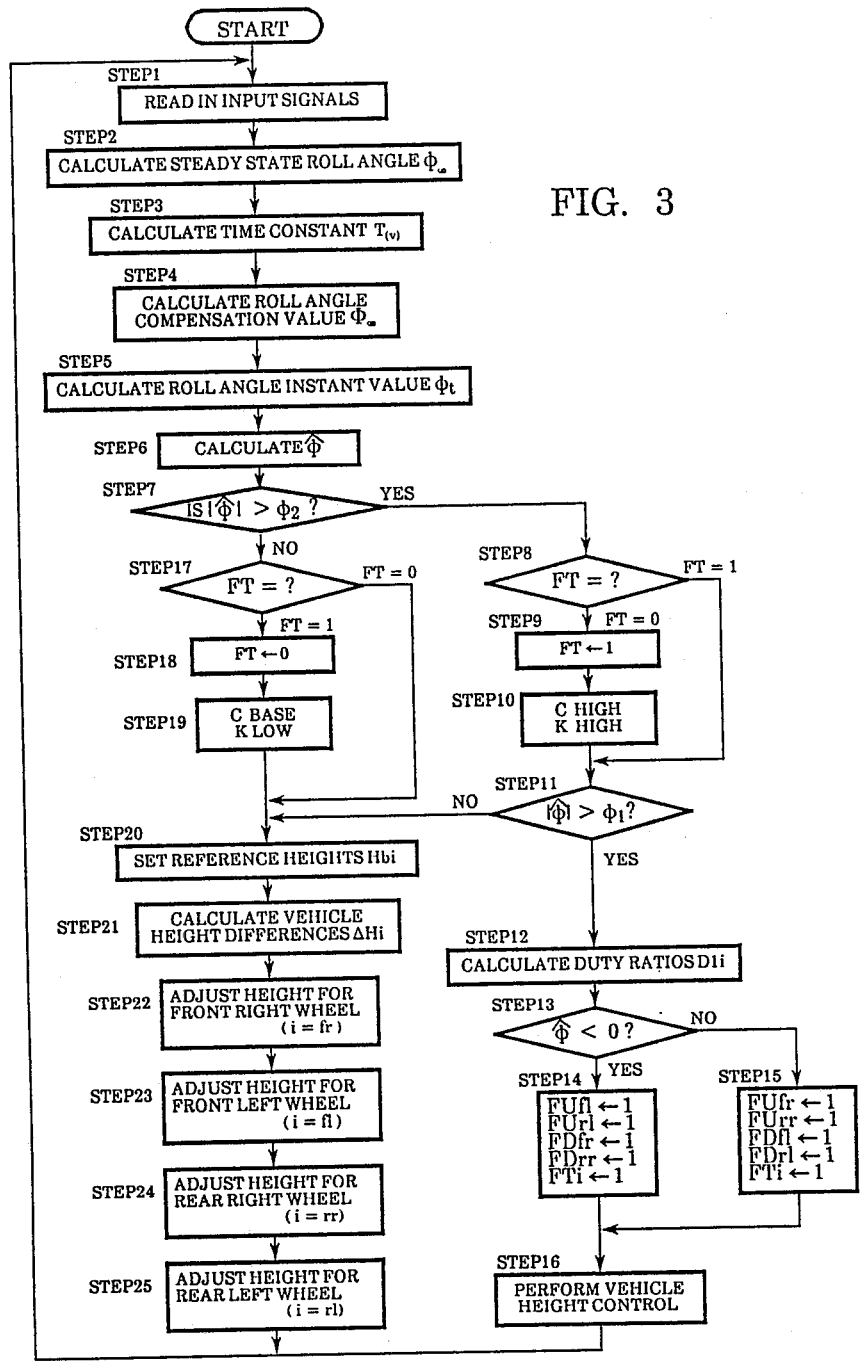
FIG. 3 is a flow chart showing the overall flow of a cyclical program which directs the operation of said micro computer utilized in the first preferred embodiment of the vehicle roll control system of the present invention.
Figure 4:
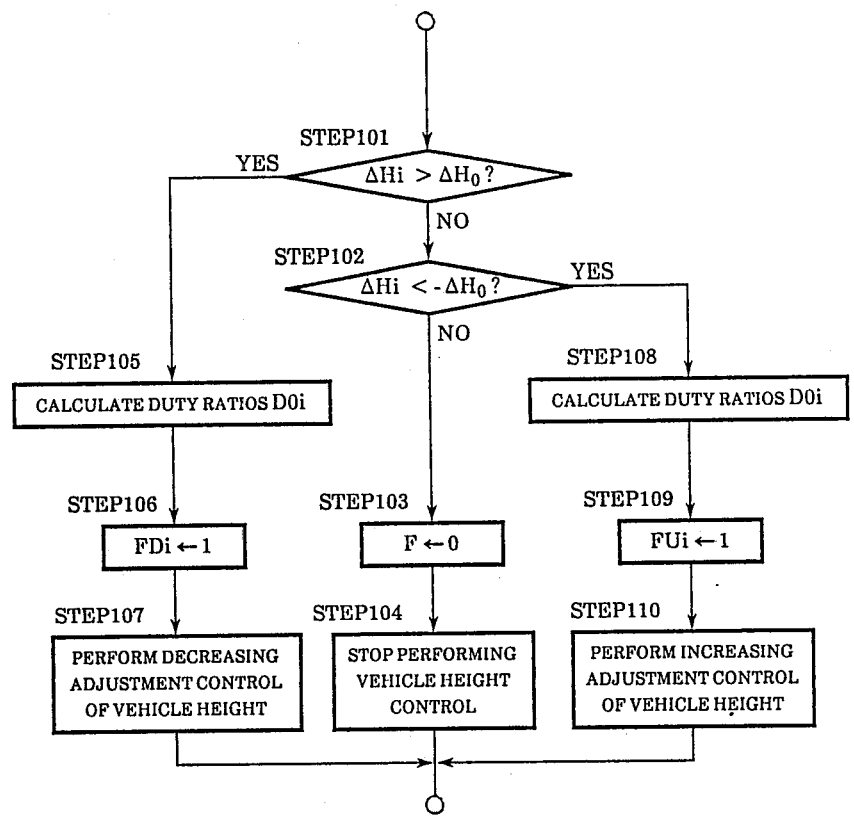
FIG. 4 is a detailed flow chart of a portion of the FIG. 3 program, showing in more detail a routine which in FIG. 3 is abbreviated simply by four blocks, and this figure is applicable to the second preferred embodiment also.

Referring next to the flow charts shown in FIGS. 3 and 4, the graphs shown in FIGS. 5 through 7, and the time chart of FIG. 8, the operation of the micro computer 103 incorporated in the first preferred embodiment of the system for vehicle roll controlled of the present invention as shown in gross detail in FIGS. 1 and 2 will be explained. FIG. 3 is a flow chart showing the overall flow of said operation of said micro computer 103, and it will easily be observed that this overall program flow is a repetitive cycle which will typically take place over a certain characteristic approximate cycle time; while FIG. 4 is a flow chart showing in detail a routine which in the flow chart shown in FIG. 3 is abbreviated simply by each of the steps 22 through 25. In the program of FIG. 3, each of the flags FUi (where "i" is "fr", "fl", "rr", and "rl" referring to the front right, the front left, the rear right, and the rear lift vehicle wheels) is concerned with whether or not an energizing electrical signal is currently being supplied to the corresponding one of the flow rate control valves 18, 19, 28, and 29, and the corresponding one of the switching valves 16, 17, 26, and 27, for supplying the corresponding one of the actuators 2fr, 2fl, 2rr, and 2rl with pressurized working fluid, and as before a flag value of zero indicates that the energizing electrical signal is not currently being supplied while a flag value of unity indicates that an energizing electrical signal is currently being supplied. Similarly, each of the flags FDi (where "i" is again "fr", "fl", "rr", and "rl" referring to the front right, the front left, the rear right, and the rear left vehicle wheels) is concerned with whether or not an energizing electrical signal is currently being supplied to the corresponding one of the flow rate control valves 32, 33, 39, and 40 and the corresponding one of the switching valves 34, 35, 41, and 42 for venting working fluid from the corresponding one of the actuators 2fr, 2fl, 2rr, and 2rl, and a flag value of zero indicates that an energizing electrical signal is not currently being supplied while a flag value of unity indicates that an energizing electrical signal is currently being supplied. Further, the flags FTi (where "i" is again "fr", "fl", "rr", and "rl" referring to the front right, the front left, the rear right, and the rear left vehicle wheels) are concerned with the setting of the damping effect C and of the spring rate K, and a flag value of zero indicates that the damping effect C is adjusted to a base mode (low in the case of the auto normal base mode (ANB), and medium in the case of the auto sports base mode (ASB), and the spring rate K is adjusted to low, while a flag value of unity indicates that the damping effect C and the spring rate K are both adjusted to high. Further, the expression "flags Fi" will be used as a general term for referring to these flags FUi, FDi, and FTi.

In the first step 1, then, first, the vehicle heights Hi (where "i" is again "fr", "fl", "rr", and "rl" referring to the front right, the front left, the rear right, and the rear left vehicle wheels) detected by the respective vehicle height sensors 87 through 90, the vehicle speed V detected by the vehicle speed sensor 95, the steering angle detected by the steering angle sensor 96, the throttle opening detected by the throttle position sensor 97, the vehicle braking state detected by the braking sensor 98, the switch function S input from the vehicle height selection switch 110, and the damping effect selecting switch function input from the damping effect selecting switch not shown in the figure, are in turn read in, and then the flow of control passes to the next step 2.

Figure 5:
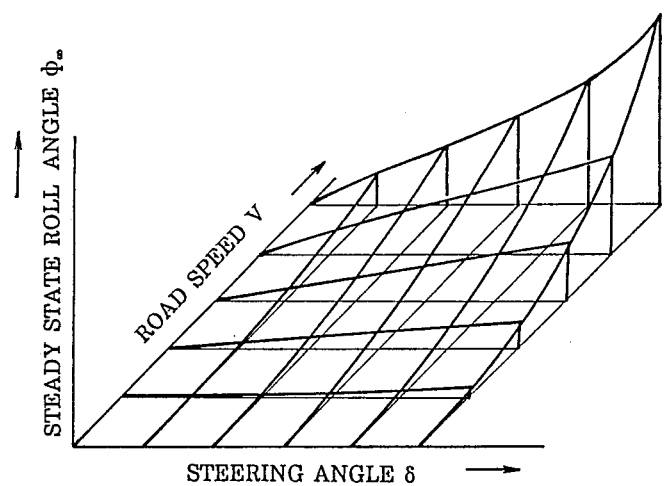
FIG. 5 is a graph relating to both of the preferred embodiments, exemplarily showing the positive quadrant portion of a map stored in said micro computer and corresponding to a steady state roll angle $\phi_\infty$ for the vehicle body.

In the next step 2, based upon the vehicle speed V and the steering angle $\phi$ read in in the step 1, a steady state roll angle $\phi_\infty$ is calculated from the map corresponding to the graph shown in FIG. 5, values representative of which are stored in the ROM 105; again in this case, the anticlockwise direction relative to the forward direction of the vehicle is considered positive as far as the sign of the steady state angle $\phi_\infty$ is considered. Subsequently the flow of control passes to the next step 3.

In the next step 3, based upon the vehicle speed V read in in the step 1, a time constant $T(v)$ is calculated which has vehicle speed V as a parameter and is utilized in the equation used in the step 4 to be described shortly. Subsequently the flow of control passes next to the step 4.

In the next step 4, based upon the value of $\phi_\infty$ and upon $T(v)$ calculated in the previous steps 2 and 3 respectively, a compensating value $\Phi_\infty$ of roll angle is calculated following the equation laid out below, and then the flow of control passes next to the step 5. In this equation, "s" represents the Laplace operator.

$$\Phi_\infty = \frac{T(v)s}{1 + T(v)s} \phi_\infty \qquad (10)$$

In the next step 5, an actual roll angle $\phi_{\alpha f}$ of the vehicle body as far as the front wheels are concerned, an actual roll angle $\phi_r$ of the vehicle body as far as the rear wheels are concerned, and the instantaneous value $\phi_t$ of the roll angle of the vehicle body which is the average value of these actual roll angles $\phi_f$ and $\phi_r$ are calculated, following the equations described below, and next the flow of control passes to the step 6.

$$\phi_f = \tan^{-1} \frac{Hfr - Hfl}{Tf} \qquad (11)$$

$$\phi_r = \tan^{-1} \frac{Hrr - Hrl}{Tr} \qquad (12)$$

$$\phi_t = (\phi_f + \phi_r)/2 \qquad (13)$$

In the step 6, the difference $\hat{\phi}$ between a desired roll angle $\phi_a$ stored in the ROM 105 and the compensating value $\Phi_\infty$ plus the instantaneous value $\phi_t$ of the roll angle is calculated, following the equation described below. Although the desired roll angle $\phi_a$ is taken as being zero in the first preferred embodiment shown, it may in fact have a constant value near zero, the absolute value of which is less than $\phi_0$ described below, and the sign of which is positive or negative when $\phi_\infty$ is positive or negative, respectively. Subsequently, the flow of control passes next to the step 7.

$$\hat{\phi} = \phi_a - (k_1 \phi_\infty + k_2 \phi_t) \qquad (14)$$

where k1 and k2 are positive constants.

In the next step 7, a decision is made as to whether the absolute value of the roll angle difference $\hat{\phi}$ is greater than a controlling threshold value $\phi_2$ as a second determinate value, which is a positive constant near zero. If a decision is made that the absolute value of the difference $\hat{\phi}$ is greater than $\phi_2$, then the flow of control passes next to the step 8, while if a decision is made that the absolute value of the difference $\hat{\phi}$ is not greater than $\phi_2$, then the flow of control passes next to the step 17.

In the step 8, a decision is made as to whether the flag FT is zero or unity. If a decision is made that the flag FT equals zero, then the flow of control passes next to the step 9, and if a decision is made that the flag FT equals unity, then the flow of control passes next to the step 11.

In the step 9, the flag FT is set to unity, and the flow of control passes next to the step 10.

In the step 10, the actuating electrical signal supplied to the motors 79 through 82 and 83 through 86 is controlled so as to set the damping force C and the spring rate K to high, and then the flow of control passes next to the step 11.

In the step 11, a decision is made as to whether or not the absolute value of the difference $\hat{\phi}$ of roll angle calculated in the step 6 is greater than a controlling threshold value $\phi_1$ as a first determinate value, which is a positive constant greater than the second determinate value $\phi_2$. If a decision is made that the absolute value of $\hat{\phi}$ is greater than $\phi_1$ (and a priori therefore is greater than $\phi_2$), then the flow of control passes next to the step 12, while, if a decision is made that the absolute value of $\hat{\phi}$ is not greater than $\phi_1$, then the flow of control passes next to the step 20.

Figure 6:
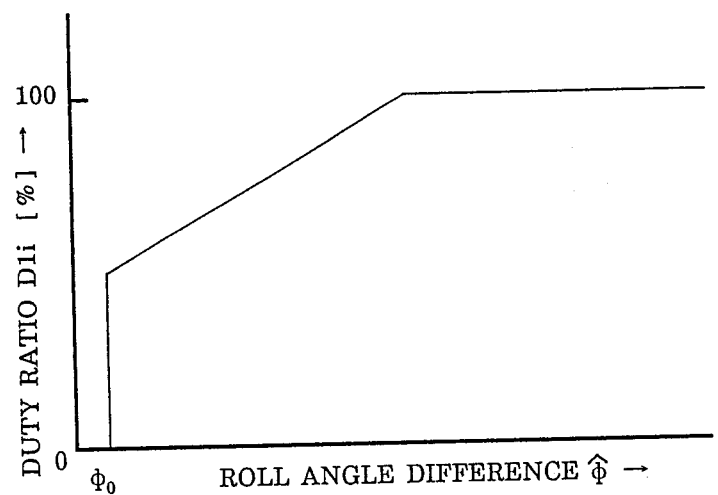
FIG. 6 is a graph relating to the first preferred embodiment, exemplarily showing a map stored in said micro computer and corresponding to the duty ratio for an energizing electrical signal Dli to be supplied to a flow rate control valve.

In the step 12, based upon the roll angle difference $\hat{\phi}$ calculated in the step 6, duty ratios Dli are calculated for the energizing electrical signals supplied to the flow rate control valves from a map corresponding to the graphs of which one is exemplarily shown in FIG. 6 stored in the ROM 105, and then the flow of control passes to the next step 13.

In this next step 13, a decision is made as to whether or not the roll angle difference $\hat{\phi}$ is negative. If a decision is made that the roll angle difference $\hat{\phi}$ is less than zero, the flow of control passes next to the step 14, while, if a decision is made that the roll angle difference $\hat{\phi}$ is not greater than zero, then the flow of control passes next to the step 15.

In the step 14, the flags FUfl, FUrl, FDfr, FDrr, and FTi are set to unity. Then the flow of control passes next to the step 16.

On the other hand, in the step 15, the flags FUfr, FUrr, FDfl, FDrl, and FTi are set to unity. Then the flow of control passes next to the step 16.

In the step 16, the vehicle height control is performed; in other words, if the flow of control has arrived at this step 16 via the step 14, energizing electrical signals with duty ratios Dfl and Drl are supplied to the flow rate control valves 19 and 29 for supplying fluid to the actuator 2fl for the front left wheel and to the actuator 2rl for the rear left wheel, respectively. Similarly, energizing electrical signals with duty ratios Dfr and Drr are supplied to the flow rate control valves 32 and 39 for discharging fluid from the actuator for the front right wheel and from the actuator for the rear right wheel, respectively. Simultaneously, energizing electrical signals are supplied to the associated ON/OFF switching valves 17, 27, 34, and 41 for opening them, while no energizing electrical signals are supplied to the other ON/OFF switching valves 16, 26, 35, and 42, thus leaving them closed. Thus, the vehicle height is thereby increasingly adjusted on the left side of the vehicle and is simultaneously decreasingly adjusted on the right side of the vehicle. On the other hand, if the flow of control has arrived at this step 16 via the step 15, energizing electrical signals with duty ratios Dfr and Drr are supplied to the flow rate control valves 18 and 28 for supplying fluid to the actuator 2fr for the front right wheel and to the actuator 2rr for the rear right wheel, respectively. Similarly, energizing electrical signals with duty ratios Dfl and Drl are supplied to the flow rate control valves 33 and 40 for discharging fluid from the actuator 2fl for the front left wheel and from the actuator 2rl for the rear left wheel, respectively. Simultaneously, energizing electrical signals are supplied to the associated ON/OFF switching valves 16, 26, 35, and 42 for opening them, while no energizing electrical signals are supplied to the other ON/OFF switching valves 17, 27, 34, and 41, thus leaving them closed. Thus, the vehicle height is thereby increasingly adjustment on the right side of the vehicle and is simultaneously decreasingly adjusted on the left side of the vehicle. After the flow of control has thus finished this step 16, the program flow returns back to the step 1, to loop around again and again.

In the step 17, a decision is made as to whether or not the current value of the flag FT is equal to unity. If a decision is made that the current value of the flag FT is equal to unity, then the flow of control passes next to the step 18, and if a decision is made that the current value of the flag FT is equal to zero, then the flow of control passes next to the step 20.

In the step 18, the flag Ft is reset to zero, and then the flow of control passes next to the step 19.

In the step 19, actuating electrical signals are supplied to the motors 79 through 82 and 83 through 86 so as to adjust the damping force C and the spring rate K to low, and then the flow of control passes next to the step 20.

In the step 20, to which as mentioned above the flow of control is also transferred in the NO branch from the step 11, if as detected from the signal representative thereof sent via the input port device 107 to the micro computer 103, the setting of the vehicle height selection switch 110 is high (H), then the reference vehicle heights Hbfr and Hbfl for the front wheels are set at Hhf and the reference vehicle heights Hbrr and Hbrl for the rear wheels are set at Hhr; if said setting of said vehicle height selection switch 110 is normal (N), then the reference vehicle heights Hbfr and Hbrl for the front wheels are set at Hnf and the reference vehicle heights Hbrr and Hbrl for the rear wheels are set at Hnr; and, if said setting of said vehicle height selection switch 110 is low (L), then the reference vehicle heights Hbfr and Hbfl for the front wheels are set at Hlf and the reference vehicle heights Hbrr and Hbrl for the rear wheels are set at Hlr. In any of these three cases, next the flow of control passes to the step 21.

In the step 21, with regard to the four wheels, the differences ΔHi between the actual vehicle heights Hi and the reference vehicle heights Hbi are calculated following the formula expounded below, and then the flow of control passes next to the step 22.

$$\Delta H i = H i - H b i$$

In the step 22, the subroutine whose flow chart is shown in FIG. 4 is carried out with "i" being "fr", to thereby adjust the vehicle riding height for the front right wheel, and then the flow of control passes next to the step 23.

Next, in the step 23, the subroutine whose flow chart is shown in FIG. 4 is carried out with "i" being "fl", to thereby adjust the vehicle riding height for the front left wheel, and then the flow of control passes next to the step 24.

Next, in the step 24, the subroutine whose flow chart is shown in FIG. 4 is carried out with "i" being "rr", to thereby adjust the vehicle riding height for the rear right wheel, and then the flow of control passes next to the step 25.

Finally, in the next step 25, the subroutine whose flow chart is shown in FIG. 4 is carried out with "i" being "rl", to thereby adjust the vehicle riding height for the rear left wheel, and then as before the program flow returns back to the step 1, to loop around again and again.

Although no particular details thereof are given herein in the interests of economy of description, if the conditions which cause nose dive and squat of the vehicle body are detected, a control routine is carried out by an interrupt in order to suppress such undesired phenomena, and in this control routine the degree of flow restriction provided by the flow rate control valves 51 through 54 is increased in order to change the suspension damping effect C to high, and the ON/OFF switching valves 63 through 66 are also opened in order to change the spring rate K to high.

Next, referring to the flow chart shown in FIG. 4, the subroutine which is performed as described above in the steps 22, 23, 24, and 25 for each of the four vehicle wheels, in order to adjust the vehicle riding height at the said wheels, will be explained.

In the first step 101, a decision is made as to whether or not the vehicle height difference $\Delta Hi$ is more than a controlling threshold value $\Delta Ha$. If a decision is made that $\Delta Hi$ is not more than $\Delta Ho$, the flow of control passes next to the step 102; while, on the other hand, if a decision is made that $\Delta Hi$ is more than $\Delta Ho$, the flow of control passes next to the step 105.

In the step 102, a decision is made as to whether or not the vehicle height difference $\Delta Hi$ is less than $\Delta Ho$. If a decision is made that $\Delta Hi$ is not less than $\Delta Ho$, the flow of control passes next to the step 103; while, on the other hand, if a decision is made that $\Delta Hi$ is less than $\Delta Ho$, the flow of control passes next to the step 108.

In the step 103, all the flags F are reset to zero, and then the flow of control passes next to the step 104.

In the step 140, supplying of actuating electrical signals is stopped to the flow control valves 18, 19, 28, 29, 32, 33, 39, and 40, and to the switching valves 16, 17, 26, 27, 34, 35, 41, and 42, the thereby cease the adjustment of the vehicle height at all of the four wheels thereof. Then the flow of program control passes next to exit from this FIG. 4 subroutine, without doing anything further.

Figure 7:
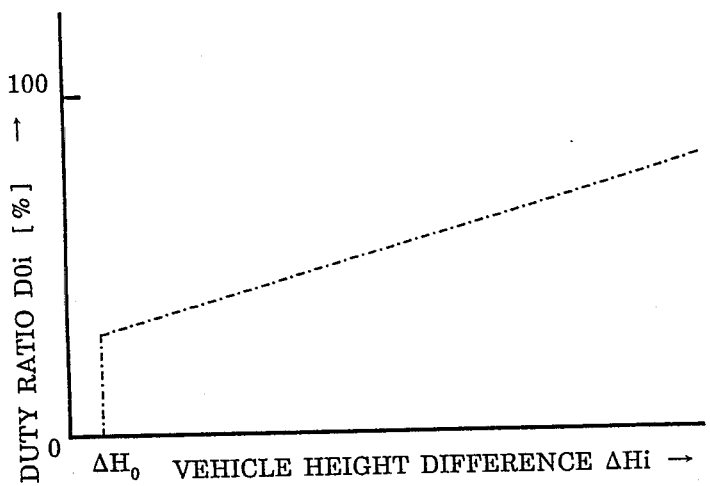
FIG. 7 is a similar graph to FIG. 6, relating to both of the preferred embodiments, and exemplarily showing a map stored in said micro computer and corresponding to the duty ratio for another energizing electrical signal DOi to be supplied to a flow rate control valve.

On the other hand, in the step 105, based upon the vehicle height difference $\Delta Hi$, a duty ratio DOi for the energizing electrical signal to be supplied to the particular flow rate control valve 32, 33, 39, or 40 for discharging fluid from the actuator 2fr, 2fl, 2rr, or 2rl for this particular vehicle wheel "i" is calculated from the map corresponding to the graph shown in FIG. 7 stored in the ROM 105, and then the flow of control passes next to the step 106.

In the step 106, the flag FDi is set to unity, and then the flow of control passes next to the step 107.

In the step 107, an energizing electrical signal is supplied with the duty ratio DOi to said particular associated flow rate control valve 32, 33, 39, or 40 for discharging fluid from the actuator 2fr, 2fl, 2rr, or 2rl for this particular vehicle wheel "i", and simultaneously therewith an energizing electrical signal is supplied to the associated switching valve 34, 35, 41, or 42, thus to perform the decreasing adjustment of the vehicle riding height at this particular wheel. Then the flow of program control passes next to exit from this FIG. 4 subroutine, without doing anything further.

In the third program branch, in the step 108, based upon the vehicle height difference $\Delta Hi$, a duty ratio DOi for the energizing electrical signal to be supplied to the particular flow rate control valve 18, 19, 28, or 29 for supplying pressurized fluid into the actuator 2fr, 2fl, 2rr, or 2rl for this particular vehicle wheel "i" is calculated from the map corresponding to the graph shown in FIG. 7 stored in the ROM 105, and then the flow of control passes next to the step 109.

In the step 109, the flag FUi is set to unity, and then the flow of control passes next to the step 110.

In the step 110, an energizing electrical signal is supplied with the duty ratio DOi to said particular associated flow rate control valve 18, 19, 28, or 29 for supplying pressurized fluid into the actuator 2fr, 2fl, 2rr, or 2rl for this particular vehicle wheel "i", and simultaneously therewith an energizing electrical signal is supplied to the associated switching valve 16, 17, 26, or 27, thus to perform the increasing adjustment of the vehicle riding height at this particular wheel. Then, again, the flow of program control passes next to exit from this FIG. 4 subroutine, without doing anything further.

Thus, in the steps 101 to 110, the heights from the road surface of the portions of the vehicle body at locations corresponding to the vehicle wheels are adjusted within the desired vehicle height range $Hbi \pm \Delta Ho$, while the vehicle is not experiencing conditions which cause the vehicle body to roll to an extent more than a determinate amount. Preferably, the controlling threshold $\Delta Ho$ for the vehicle height is set to be substantially equal to or less than the the absolute value of the difference $\Delta Hi$ of the vehicle heights for the vehicle wheels in the case where the absolute value of the roll angle difference is the first determinate value. And, therefore, $\Delta Ho$ may be set individually for each wheel, or may be set individually for the front wheels and for the rear wheels.

Figure 8:
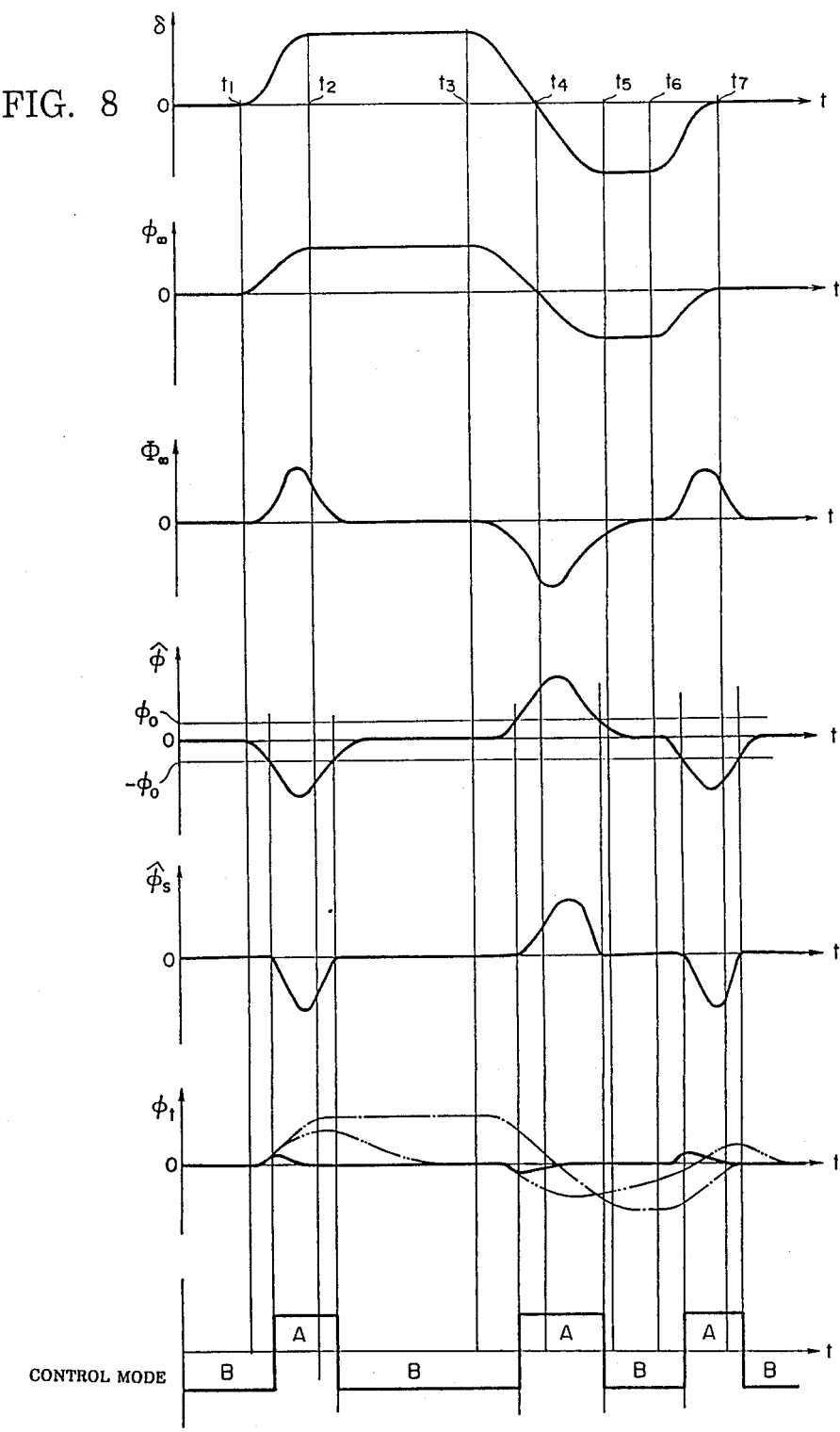
FIG. 8 is a time chart for illustrating the operation of both the first and the second preferred embodiments.

Next, referring to the program flow charts shown in FIGS. 3 and 4 and to the time chart shown in FIG. 8, the operation of this first preferred embodiment as disclosed above will be further explained with regard to the case, again utilized as an example, in which the vehicle runs along a road which is curved like a letter "S".

In the time chart of FIG. 8, the notation of "A" for the control mode indicates the periods wherein the roll control is performed via vehicle height adjustment based upon the roll prediction which is carried out in the steps 12 to 16 shown in the flow chart of FIG. 3, and the notation of "B" for the control mode indicates the periods wherein per se conventional vehicle height adjustment based upon the actual detected vehicle height differences is performed which is carried out in the steps 20 to 25 shown in the flow chart of FIG. 3.

Referring to FIG. 8, in the period up to the time point t1, since the steering angle is zero, and accordingly and are zero, in each iteration of the FIG. 3 program a decision of NO is made in the step 7. In the event where the vehicle height difference $\Delta Hi$ are within the desired vehicle height ranges Hbi±ΔHo, decisions of NO are made in the steps 101 and 102 shown in FIG. 4, and accordingly no increasing or decreasing adjustment of the vehicle height is performed. In the event where the vehicle height differences ΔHi are more than ΔHo, a decision of YES is made in the step 101; the duty ratio DOi is calculated in the step 105; an energizing electrical signal is supplied with that duty ratio DOi to the appropriate flow control valves for discharging fluid from the appropriate ones of the actuators, and simultaneously therewith an energizing electrical signal is supplied to the associated switching valves, to thereby decreasingly adjust the vehicle height within the desired vehicle height range Hbi±ΔHo. In the event where the vehicle difference ΔHi is less than, a decision of YES is made in the step 102; the duty ratio DOi is calculated in the step 108; an energizing electrical signal is supplied with that duty ratio DOi to the appropriate flow control valves for supplying pressurized working fluid to the appropriate ones of the actuators, and simultaneously therewith an energizing electrical signal is supplied to the associated switching valves, to thereby increasingly adjust the vehicle height within the desired vehicle height range Hbi±ΔHo. In this case, the damping effect is controlled to be in the base mode and the spring rate is controlled to be set at low, thereby to enhance the comfortability of the vehicle.

In the exemplary operational episode of FIG. 8, it is assumed that at the time point t1 turning right is initiated with clockwise turning of the steering wheel being initiated; at the time point t2 the vehicle starts to undergo steady state turning with the steering angle δ being constant, i.e. the steering wheel is stopped from being turned clockwise; at the time point t3 turning of the steering wheel in the opposite anticlockwise direction (to unwind the turn) is initiated; at the time point t4 the steering angle becomes zero (and the steering wheel anticlockwise turning is continued from this time point since the vehicle is being driven around a series of S-bends); at the time point t5 the vehicle is brought to the steady state left turning condition with a constant steering angle, i.e. the steering wheel is stopped from being turned anticlockwise; at the time point t6 turning back of the steering wheel in the clockwise direction is initiated; and at the time point t7 the vehicle is brought from the turning right state to the straight forward running state.

In this exemplary operational episode, the steady state roll angle $\phi_\infty$ and the other variables illustrated vary with time in such a manner as shown in FIG. 8. When the absolute value of $\hat{\phi}$ is equal to or less than $\phi_1$, a decision of NO is made in the steps 7 and 11, and thereby the steps 20 through 25 are carried out as in the case of the above described forward running state in order to adjust the vehicle height Hi within the desired vehicle height range Hbi±ΔHo. In this case, in the periods where the absolute value of the difference $\hat{\phi}$ is equal to or less than $\phi_2$, the damping effect is controlled to be in the base mode and the spring rate is controlled to be set at low, while in the periods where the absolute value of the difference $\hat{\phi}$ is greater than $\phi_2$ but is less than $\phi_1$, the damping effect and the spring effect are adjusted to high.

In the event where the absolute value of $\hat{\phi}$ is greater than $\phi_1$, then a decision of YES is made in the steps 7 and 11; the duty ratio Dli is calculated in the step 12; the sign of $\hat{\phi}$ is determined in the step 13; and then the flow of control proceeds to the step 16 by way of the step 14 in the event where $\hat{\phi}$ is less than zero, and by way of the step 15 in the event where $\hat{\phi}$ is greater than zero, and the vehicle height adjustment is performed to prevent the vehicle body from rolling, and the suspension damping effect and the spring rate are both maintained at high. In this connection it will be seen that, if the steering wheel is returned back toward the neutral position and the absolute value of $\hat{\phi}$ becomes equal to or less than $\phi_1$, a decision of NO is made in the step 11 and the flow of program control returns to the normal vehicle height adjusting mode by the steps 20 to 25.

Thus, while the actual roll angle $\phi_t$ varies as shown by the one point chain line and by the two points chain line in FIG. 8 in the event where roll control by the vehicle height adjustment is not performed and in the event where only normal per se known vehicle height adjustment based upon the vehicle height difference is effected, respectively, on the other hand, with the first preferred embodiment of the vehicle roll control system of the present invention as described above and as shown in the drawings, the actual roll angle varies as shown by the solid line, and accordingly the vehicle body is very effectively prevented from rolling without any substantial time lag in response, as compared with the prior art.

From the above description, it will be seen that according to the present invention a steady state roll angle $\phi_\infty$ of the vehicle body and a compensating value $\phi_\infty$ of roll angle are calculated from the vehicle speed V and the steering angle δ; the instantaneous value $\phi_t$ of roll angle of the vehicle body is calculated from the vehicle heights Hi; a roll angle difference $\hat{\phi}$ is calculated from the desired roll angle $\phi_a$, the compensating value $\phi_\infty$, and the instantaneous value $\phi_t$; in the event when the absolute value of the roll angle difference $\hat{\phi}$ is equal to or less than a first determinate value, the normal vehicle height adjustment is performed so that the vehicle height can be adjusted within the desired vehicle height range, and the hardness and softness characteristics of the suspension means are controlled in accordance with the roll angle difference so that the roll amount of the vehicle body is reduced in the periods when the roll amount is relatively small and yet the comfortability of the vehicle is enhanced; while, in the event when the absolute value of the roll angle difference exceeds the first determinate value, the flow rate control valves are operated by electrical signals having duty ratios corresponding to the roll angle difference, so that even in the event of rapid steering the roll control is accurately effected without any substantial time lag in response, whereby the vehicle body can be previously, positively, and precisely prevented from rolling.

Although, in the first preferred embodiment described above, the determination of the rolling direction in the step 13 was performed by determining the sign of the roll angle difference $\hat{\phi}$, this determination might alternatively be effected by determining the sign of the compensating value $\phi_\infty$ of roll angle. While, in this first preferred embodiment described above, an instantaneous value $\phi_t$ of roll angle of the vehicle body was determined by calculation from the vehicle heights Hi at locations corresponding to the respective vehicle wheels, in an alternative embodiment such an instantaneous value $\phi_t$ of vehicle body roll angle might alternatively be determined by a direct detection process with angular detecting devices such as gyroscopes or the like, or by calculation based upon the output of a lateral acceleration sensor or the like. It should yet further be noted that, although the damping effect and the spring rate were set to be at high for each wheel during turning, in the step 16, together with the adjustment of the vehicle height, the damping effect and the spring rate may be set at high only for the wheels on the radially outward side, and the damping effect may be controlled in the base mode and the spring rate may be set at low for the wheels on the radially inward side.

Furthermore, by replacing the actual roll angle $\phi_t$ with $\phi_{tf}$ and $\phi_{tr}$ and the equation (14), to calculate roll angle differences $\phi_f$ and $\phi_r$ on both the front vehicle wheel side and the rear vehicle wheel side, and performing the step 7 and the following steps on both the vehicle wheel sides, the system can be made workable even in the event where the roll rigidity of the vehicle body is relatively considerably different between the front vehicle wheels side and the rear vehicle wheels side, and the hardness and the softness characteristics of the suspension means may be individually controlled in a proper manner on both the front vehicle wheels side and the rear vehicle wheels side.

Yet further, it would be possible in a variant embodiment for a control to be provided in the passenger compartment for the driver to indicate which of a range of set values for $\phi_o$ he or she wished to utilize during vehicle operation, so that the roll control effected by the vehicle roll control system of the present invention would then conform to the operational tastes of the vehicle driver and/or the passengers in the vehicle.

THE SECOND PREFERRED EMBODIMENT

Referring next to the flow chart of FIG. 9 (similar to the FIG. 3 flow chart for the first preferred embodiment), the construction and the operation of the micro computer 103 incorporated in the second preferred embodiment of the system for vehicle roll control of the present invention will be explained.

FIGS. 1 and 2 showing the gross physical structures of the vehicle roll control system and of the micro computer 103 are applicable to this second preferred embodiment also. Thus, referring to the flow chart shown in FIG. 9, the operation of the micro computer 103 incorporated in this second preferred embodiment of the system for vehicle roll control of the present invention as shown in gross detail in FIGS. 1 and 2 will be explained without further ado. FIG. 9 is a flow chart showing the overall flow of said operation of said micro computer 103, and as before it will easily be observed that this overall program flow is a repetitive cycle which will typically take place over a certain characteristic approximate cycle time. Further, the flow chart shown in FIG. 4 above relating to the first preferred embodiment can also be used for showing in detail a routine which in the flow chart shown in FIG. 9 is abbreviated simply by each of the steps 22 through 25. In the program of FIG. 9, as before, each of the flags FUi (where "i" is "fr", "fl", "rr", and "rl" referring to the front right, the front left, the rear right, and the rear left vehicle wheels) is concerned with whether or not an energizing electrical signal is currently being supplied to the corresponding one of the flow rate control valves 18, 19, 28, and 29, and the corresponding one of the switching valves 16, 17, 26, and 27, for supplying the corresponding one of the actuators 2fr, 2fl, 2rr, and 2rl with pressurized working fluid, and as before a flag value of zero indicates that the energizing electrical signal is not currently being supplied while a flag of unity indicates that an energizing electrical signal is currently being supplied. Similarly, again as before, each of the flags FDi (where "i" is again "fr", "fl", "rr", and "rl" referring to the front right, the front left, the rear right, and the rear left vehicle wheels) is concerned with whether or not an energizing electrical signal is currently being supplied to the corresponding one of the flow rate control valves 32, 33, 39, and 40 and the corresponding one of the switching valves 34, 35, 41, and 42 for venting working fluid from the corresponding one of the actuators 2fr, 2fl, 2rr, and 2rl, and as before a flag value of zero indicates that an energizing electrical signal is not currently being supplied while a flag value of unity indicates that an energizing electrical signal is currently being supplied. Further, the flags FTi (where "i" is again "fr", "fl", "rr", and "rl" referring to the front right, the front left, the rear right, and the rear left vehicle wheels) as before are concerned with the setting of the damping effect C and of the spring rate K, and likewise a flag value of zero indicates that the damping effect C is adjusted to a base mode (low in the case of the auto normal base mode (ANB), and medium in the case of the auto sports base mode (ASB), and the spring rate K is adjusted to low, while a flag value of unity indicates that the damping effect C and the spring rate K are both adjusted to high. Further, the expression "flags Fi" will, in the description of this second preferred embodiment also, be used as a general term for referring to these flags FUi, FDi, and FTi.

In the first step 1, then, first, the vehicle heights Hi (where "i" is again "fr", "fl", "rr", and "rl" referring to the front right, the front left, the rear right and the rear left vehicle wheels) detected by the respective vehicle height sensors 87 through 90, the vehicle speed V detected by the vehicle speed sensor 95, the steering angle detected by the steering angle sensor 96, the throttle opening detected by the throttle position sensor 97, the vehicle braking state detected by the braking sensor 98, the switch function S input from the vehicle height selection switch 110, and the damping effect selecting switch function input from the damping effect selecting switch not shown in the figure, are in turn read in, and then the flow of control passes to the next step 2.

In the next step 2, based upon the vehicle speed V and the steering angle $\delta$ read in in the step 1, a steady state roll angle $\phi_\infty$ is calculated from the map corresponding to the graph shown in FIG. 5, values representative of which are stored in the ROM 105; again in this case, the anticlockwise direction relative to the forward direction of the vehicle is considered positive as far as the sign of the steady state angle $\phi_\infty$ is considered. Subsequently the flow of control passes to the next step 3.

In the next step 3, based upon the vehicle speed V read in in the step 1, a time constant T(v) is calculated which has vehicle speed V as a parameter and is utilized in the equation used in the step 4 to be described shortly. Subsequently the flow of control passes next to the step 4.

In the next step 4, based upon the value of $\phi_\infty$ and upon T(v) calculated in the previous steps 2 and 3 respectively, a compensating value $\phi_\infty$ of roll angle is calculated following the equation laid out below, and then the flow of control passes next to the step 5. In this equation, "s" represents the Laplace operator.

$$\Phi_\infty = \frac{Tvs}{1 + Tvs} \phi_\infty \tag{10}$$

In the next step 5, an actual roll angle $\phi_f$ of the vehicle body as far as the front wheels are concerned, an actual roll angle $\phi_r$ of the vehicle body as far as the rear wheels are concerned, and the instantaneous value $\phi_t$ of the roll angle of the vehicle body which is the average value of these actual roll angles $\phi_f$ and $\phi_r$ are calculated, following the equations described below, and next the flow of control passes to the step 6.

$$\phi_f = \tan^{-1} \frac{Hfr - Hfl}{Tf} \quad (11)$$

$$\phi_r = \tan^{-1} \frac{Hrr - Hrl}{Tr} \quad (12)$$

$$\phi_t = (\phi_f + \phi_r)/2 \quad (13)$$

In the step 6, the difference $\hat{\phi}$ between a desired roll angle $\phi_a$ stored in the ROM 105 and the compensating value $\phi_\infty$ plus the instantaneous value $\phi_t$ of the roll angle is calculated, following the equation described below. Although the desired roll angle $\phi_a$ is taken as being zero in the second preferred embodiment shown, it may in fact have a constant value near zero, the absolute value of which is less than $\phi_o$ described below, and the sign of which is positive or negative when $\phi_\infty$ is positive or negative, respectively. Subsequently, the flow of control passes next to the step 7.

$$\hat{\phi} = \phi_a - (k_1 \phi_\infty + k_2 \phi_t) \quad (14)$$

where k1 and k2 are positive constants.

In the next step 7, a decision is made as to whether the absolute value of the roll angle difference $\hat{\phi}$ is greater than a controlling threshold value $\phi_2$ as a second determinate value, which is a positive constant near zero. If a decision is made that the absolute value of the difference $\hat{\phi}$ is greater than $\phi_2$, then the flow of control passes next to the step 8, while if a decision is made that the absolute value of the difference $\hat{\phi}$ is not greater than $\phi_2$, then the flow of control passes next to the step 17.

In the step 8, a decision is made as to whether the flag FT is zero or unity. If a decision is made that the flag FT equals zero, then the flow of control passes next to the step 9, and if a decision is made that the flag FT equals unity, then the flow of control passes next to the step 11.

In the step 9, the flag FT is set to unity, and the flow of control passes next to the step 10.

In the step 10, the actuating electrical signal supplied to the motors 79 through 82 and 83 through 85 86 is controlled so as to set the damping force C and the spring rate K to high, and then the flow of control passes next to the step 11.

In the step 11, a decision is made as to whether or not the absolute value of the difference $\hat{\phi}$ of roll angle calculated in the step 6 is greater than a controlling threshold value $\phi_1$ as a firs t determinate value, which is a positive constant greater than the second determinate value $\phi_2$. If a decision is made that the absolute value of $\hat{\phi}$ is greater than $\phi_1$ (and a priori therefore is greater than $\phi_2$), then the flow of control passes next to the step 11a, while, if a decision is made that the absolute value of $\hat{\phi}$ is not greater than $\phi_1$, then the flow of control passes next to the step 20.

Figure 11:
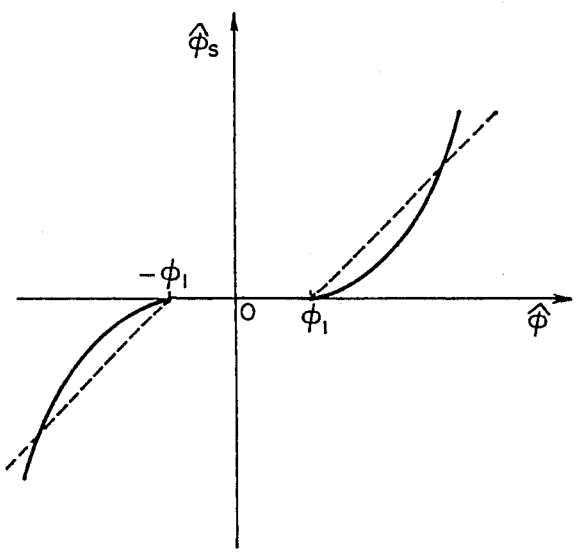
FIG. 11 is a diagram for illustrating how a modified value of a roll angle difference is calculated, during the operation of the second preferred embodiment of the present invention.

In the step 11a, as shown schematically in FIG. 11, by carrying out a calculation of the so called threshold filter type on the roll angle difference $\hat{\phi}$, following the following equations:

$$\hat{\phi}_s = k_3(\hat{\phi} - \phi_1) \quad (\hat{\phi} > \phi_1)$$

$$\hat{\phi}_s = k_4(\hat{\phi} - \phi_1) \quad (\hat{\phi} < -\phi_1)$$

where k3 and k4 are positive constants, a modified value $\hat{\phi}_s$ of the roll angle difference $\hat{\phi}$ is calculated, and the flow of control then passes next to the step 12.

Figure 12:
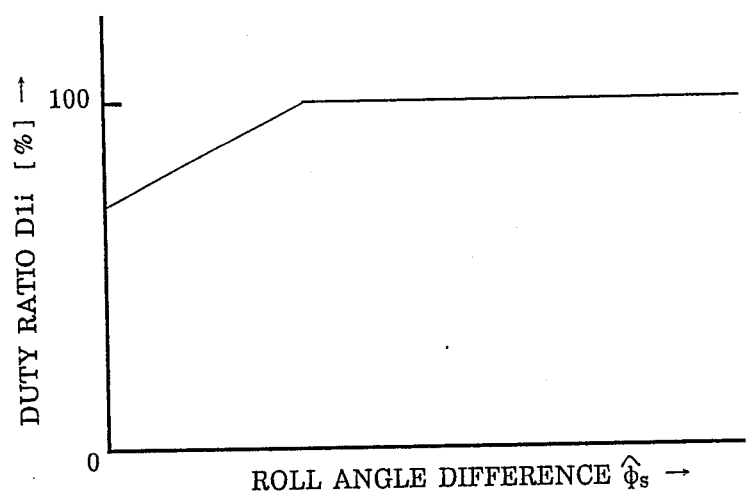
FIG. 12 is a graph relating to the second preferred embodiment similar to FIG. 6, exemplarily showing a map stored in said micro computer and corresponding to the duty ratio for an energizing electrical signal Dli to be supplied to a flow rate control valve.

In the step 12, based upon the modified value $\hat{\phi}_s$ of the roll angle difference $\hat{\phi}$, as calculated in the step 11a, duty ratios Dli are calculated for the energizing electrical signals supplied to the flow rate control valves from a map corresponding to the graphs of which one is exemplarily shown in FIG. 12 stored in the ROM 105, and then the flow of control passes to the next step 13.

In this next step 13, a decision is made as to whether or not the roll angle difference $\hat{\phi}$ is negative. If a decision is made that the roll angle difference $\hat{\phi}$ is less than zero, the flow of control passes next to the step 14, while, if a decision is made that the roll angle difference $\hat{\phi}$ is not greater than zero, then the flow of control passes next to the step 15.

In the step 14, the flags FUfl, FUrl, FDfr, FDrr, and FTi are set to unity. Then the flow of control passes next to the step 16.

On the other hand, in the step 15, the flags FUfr, FUrr, FDfl, FDrl, and FTi are set to unity. Then the flow of control passes next to the step 16.

In the step 16, the vehicle height control is performed; in other words, if the flow of control has arrived at this step 16 via the step 14, energizing electrical signals with duty ratios Dfl and Drl are supplied to the flow rate control valves 19 and 29 for supplying fluid to the actuator 2fl for the front left wheel and to the actuator 2rl for the rear left wheel, respectively. Similarly, energizing electrical signals with duty ratios Dfr and Drr are supplied to the flow rate control valves 32 and 39 for discharging fluid from the actuator for the front right wheel and from the actuator for the rear right wheel, respectively. Simultaneously, energizing electrical signals are supplied to the associated ON/OFF switching valves 17, 27, 34, and 41 for opening them, while no energizing electrical signals are supplied to the other ON/OFF switching valves 16, 26, 35, and 42, thus leaving them closed. Thus, the vehicle height is thereby increasingly adjusted on the left side of the vehicle and is simultaneously decreasingly adjusted on the right side of the vehicle. On the other hand, if the flow of control has arrived at this step 16 via the step 15, energizing electrical signals with duty ratios Dfr and Drr are supplied to the flow rate control valves 18 and 28 for supplying fluid to the actuator 2fr for the front right wheel and to the actuator 2rr for the rear right wheel, respectively. Similarly, energizing electrical signals with duty ratios Dfl and Frl are supplied to the flow rate control valves 33 and 40 for discharging fluid from the actuator 2fl for the front left wheel and from the actuator 2rl for the rear left wheel, respectively. Simultaneously, energizing electrical signals are supplied to the associated ON/OFF switching valves 16, 26, 35, and 42 for opening them, while no energizing electrical signals are supplied to the other ON/OFF switching valves 17, 27, 34, and 41, thus leaving them closed. Thus, the vehicle height is thereby increasingly adjusted on the right side of the vehicle and is simultaneously decreasingly adjusted on the left side of the vehicle. After the flow of control has thus finished this step 16, the program flow returns back to the step 1, to loop around again and again.

In the step 17, a decision is made as to whether or not the current value of the flag FT is equal to unity. If a decision is made that the current value of the flag FT is equal to unity, then the flow of control passes next to the step 18, and if a decision is made that the current value of the flag FT is equal to zero, then the flow of control passes next to the step 20.

In the step 18, the flag FT is reset to zero, and then the flow of control passes next to the step 19.

In the step 19, actuating electrical signals are supplied to the motors 79 through 82 and 83 through 86 so as to adjust the damping force C and the spring rate K to low, and then the flow of control passes next to the step 20.

In the step 20, to which as mentioned above the flow of control is also transferred in the NO branch from the step 11, if as detected from the signal representative thereof sent via the input port device 107 to the micro computer 103, the setting of the vehicle height selection switch 110 is high (H), then the reference vehicle heights Hbfr and Hbfl for the front wheels are set at Hhf and the reference vehicle heights Hbrr and Hbrl for the rear wheels are set at Hhr; if said setting of said vehicle height selection switch 110 is normal (N), then the reference vehicle heights Hbfr and Hbfl for the front wheels are set at Hnf and the reference vehicle heights Hbrr and hbrl for the rear wheels are set at Hnr; and, if said setting of said vehicle height selection switch 110 is low (L), then the reference vehicle heights Hbfr and Hbfl for the front wheels are set at Hlf and the reference vehicle heights Hbrr and Hbrl for the rear wheel are set at Hlr. In any of these three cases, next the flow of control passes to the step 21.

In the step 21, with regard to the four wheels, the differences ΔHi between the actual vehicle heights Hi and the reference vehicle heights Hbi are calculated following the formula expounded below, and then the flow of control passes next to the step 22.

$$\Delta H i = H i - H b i$$

In the step 22, the subroutine whose flow chart is shown in FIG. 4 is carried out with "i" being "fr", to thereby adjust the vehicle riding height for the front right wheel, and then the flow of control passes next to the step 23.

Next, in the step 23, the subroutine whose flow chart is shown in FIG. 4 is carried out with "i" being "fl", to thereby adjust the vehicle riding height for the front left wheel, and then the flow of control passes next to the step 24.

Next, in the step 24, the subroutine whose flow chart is shown in FIG. 4 is carried out with "i" being "rr", to thereby adjust the vehicle riding height for the rear right wheel, and then the flow of control passes next to the step 25.

Finally, in the next step 25, the subroutine whose flow chart is shown in FIG. 4 is carried out with "i" being "rl", to thereby adjust the vehicle riding height for the rear left wheel, and then as before the program flow returns back to the step 1, to loop around again and again.

Although no particular details thereof are given herein in the interests of economy of description, if the conditions which cause nose dive and squat of the vehicle body are detected, a control routine is carried out by an interrupt in order to suppress such undesired phenomena, and in this control routine the degree of flow restriction provided by the flow rate control valves 51 through 54 is increased in order to change the suspension damping effect C to high, and the ON/OFF switching valves 63 through 66 are also opened in order to change the spring rate K to high.

Next, referring to the flow chart shown in FIG. 4 which is suitable for explaining the operation of this second preferred embodiment also, the subroutine which is performed as described above in the steps 22, 23, 24, and 25 for each of the four vehicle wheels, in order to adjust the vehicle riding height at said wheels, will be explained.

In the first step 101, a decision is made as to whether or not the vehicle height difference ΔHi is more than a controlling threshold value ΔHo. If a decision is made that ΔHi is not more than ΔHo, the flow of control passes next to the step 102; while, on the other hand, if a decision is made that ΔHi is more than ΔHo, the flow of control passes next to the step 105.

In the step 102, a decision is made as to whether or not the vehicle height difference ΔHi is less than ΔHo. If a decision is made that ΔHi is not less than ΔHo, the flow of control passes next to the step 103; while, on the other hand, if a decision is made that ΔHi is less than ΔHo, the flow of control passes next to the step 108.

In the step 103, all the flags F are reset to zero, and then the flow of control passes next to the step 104

In the step 104, supplying of actuating electrical signals is stopped to the flow control valves 18, 19, 28, 29, 32, 33, 39, and 40, and to the switching valves 16, 17, 26, 27, 34, 35, 41, and 42, to thereby cease the adjustment of the vehicle height at all of the four wheels thereof. Then the flow of program control passes next to exit from this FIG. 4 subroutine, without doing anything further.

On the other hand, in the step 105, based upon the vehicle height difference ΔHi, a duty ratio DOi for the energizing electrical signal to be supplied to the particular flow rate control valve 32, 33, 39, or 40 for discharging fluid from the actuator 2fr, 2fl, 2rr, or 2rl for this particular vehicle wheel "i" is calculated from the map corresponding to the graph shown in FIG. 7 stored in the ROM 105, and then the flow of control passes next to the step 106.

In the step 106, the flag FDi is set to unity, and then the flow of control passes next to the step 107.

In the step 107, an energizing electrical signal is supplied with the duty ratio DOi to said particular associated flow rate control valve 32, 33, 39, or 40 for discharging fluid from the actuator 2fr, 2fl, 2rr, or 2rl for this particular vehicle wheel "i", and simultaneously therewith an energizing electrical signal is supplied to the associated switching valve 34, 35, 41, or 42, thus to perform the decreasing adjustment of the vehicle riding height at this particular wheel. Then the flow of program control passes next to exit from this FIG. 4 subroutine, without doing anything further.

In the third program branch, in the step 108, based upon the vehicle height difference ΔHi, a duty ratio DOi for the energizing electrical signal to supplied to the particular flow rate control valve 18, 19, 28, or 29 for supplying pressurized fluid into the actuator 2fr, 2fl, 2rr, or 2rl for this particular vehicle wheel "i" is calculated from the map corresponding to the graph shown in FIG. 7 stored in the ROM 105, and then the flow of control passes next to the step 109.

In the step 109, the flag FUi is set to unity, and then the flow of control passes next to the step 110.

In the step 110, an energizing electrical signal is supplied with the duty ratio DOi to said particular associated flow rate control valve 18, 19, 28, or 29 for supplying pressurized fluid into the actuator 2fr, 2fl, 2rr, or 2rl for this particular vehicle wheel "i", and simultaneously therewith an energizing electrical signal is supplied to the associated switching valve 16, 17, 26, or 27, thus to perform the increasing adjustment of the vehicle riding height at this particular wheel. Then, again, the flow of program control passes next to exit from this FIG. 4 subroutine, without doing anything further.

Thus, in the steps 101 to 110, the heights from the road surface of the portions of the vehicle body at locations corresponding to the vehicle wheels are adjusted within the desired vehicle height range Hbi±ΔHo, while the vehicle is not experiencing conditions which cause the vehicle body to roll to an extent more than a determinate amount. Preferably, the controlling threshold ΔHo for the vehicle height is set to be substantially equal to or less than the absolute value of the difference ΔHi of the vehicle heights for the vehicle wheels in the case where the absolute value of the roll angle difference $\phi$ is the first determinate value $\phi_1$. And, therefore, ΔHo may be set individually for each wheel, or may be set individually for the front wheels and for the rear wheels.

Figure 9:
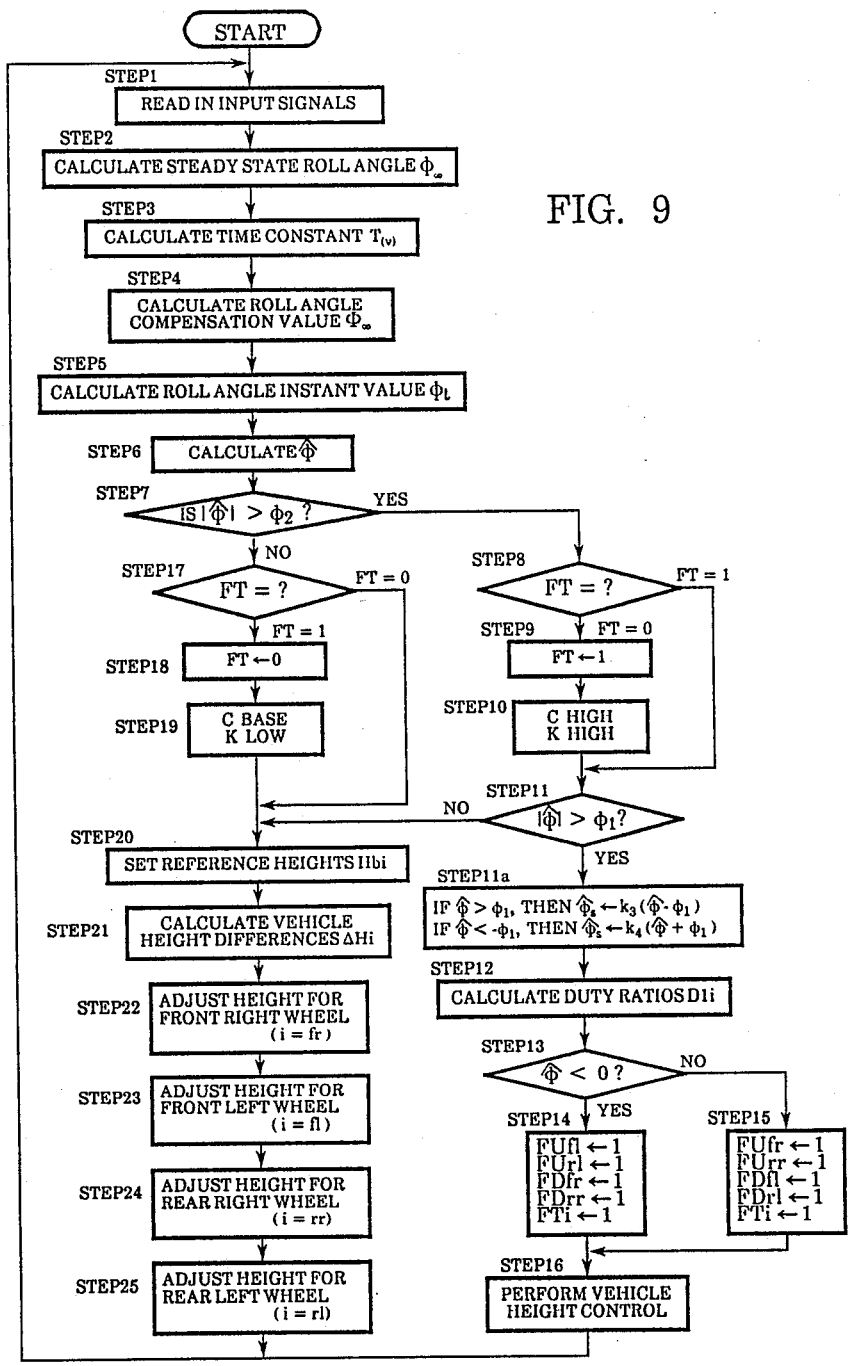
FIG. 9, similarly to FIG. 3 for the first preferred embodiment, is a flow chart showing the overall flow of a cyclical program which directs the operation of said micro computer utilized in the second preferred embodiment of the vehicle roll control system of the present invention.
Figure 10:
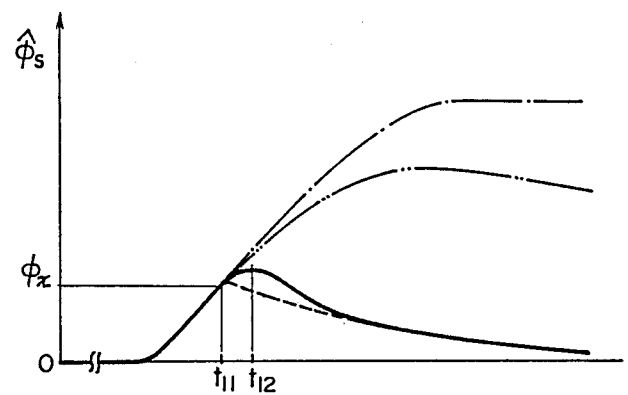
FIG. 10 is a supplementary time chart for illustrating for illustrating particular features of the operation of the second preferred embodiment.

Next, referring to the program flow charts shown in FIGS. 9 and 4 and to the time chart shown in FIG. 8 which is applicable to this second preferred embodiment also, as well as to the time chart of FIG. 10, the operation of this second preferred embodiment as disclosed above will be further explained with regard to the case, again utilized as an example, in which the vehicle runs along a road which is curved like a letter "S".

As before, in the time chart of FIG. 9, the notation of "A" for the control mode indicates the periods wherein the roll control is performed via vehicle height adjustment based upon the roll prediction which is carried out in the steps 12 to 16 shown in the flow chart of FIG. 8, and the notation of "B" for the control mode indicates the periods wherein per se conventional vehicle height adjustment based upon the actual detected vehicle height differences is performed which is carried out in the steps 20 to 25 shown in the flow chart of FIG. 9.

Referring to FIG. 8, in the period up to the time point t1, since the steering angle δ is zero, and accordingly $\phi_\infty$ and $\phi_t$ are zero, in each iteration of the FIG. 9 program a decision of NO is made in the step 7. In the event where the vehicle height differences ΔHi are within the desired vehicle height ranges Hbi±ΔHo, decisions of NO are made in the steps 101 and 102 shown in FIG. 4, and accordingly no increasing or decreasing adjustment of the vehicle height is performed. In the event where the vehicle height differences ΔHi are more than ΔHo, a decision of YES is made in the step 101; the duty ratio DOi is calculated in the step 105; an energizing electrical signal is supplied with that duty ratio DOi to the appropriate flow control valves for discharging fluid from the appropriate ones of the actuators, and simultaneously therewith an energizing electrical signal is supplied to the associated switching valves, to thereby decreasingly adjust the vehicle height within the desired vehicle height range Hbi±ΔHo. In the event where the vehicle height difference ΔHi is less than-ΔHo, a decision of YES is made in the step 102; the duty ratio DOi is calculated in the step 108, an energizing electrical signal is supplied with that duty ratio DOi to the appropriate flow control valves for supplying pressurized working fluid to the appropriate ones of the actuators, and simultaneously therewith an energizing electrical signal is supplied to the associated switching valves, to thereby increasingly adjust the vehicle height within the desired vehicle height range Hbi±ΔHo. In this case, the damping effect is controlled to be in the base mode and the spring rate is controlled to be set at low thereby to enhance the comfortability of the vehicle.

In the exemplary operational episode of FIG. 8, it is assumed that at the time point t1 turning right is initiated with clockwise turning of the steering wheel being initiated; at the time point t2 the vehicle starts to undergo steady state turning with the steering angle being constant, i.e. the steering wheel is stopped from being turned clockwise; at the time point t3 turning of the steering wheel in the opposite anticlockwise direction (to unwind the turn) is initiated; at the time point t4 the steering angle becomes zero (and the steering wheel anticlockwise turning is continued from this time point since the vehicle is being driven around a series of S-bends); at the time point t5 the vehicle is brought to the steady state left turning condition with a constant steering angle, i.e. the steering wheel is stopped from being turned anticlockwise; at the time point t6 turning back of the steering wheel in the clockwise direction is initiated; and at the time point t7 the vehicle is brought from the turning right state to the straight forward running state.

In this exemplary operational episode, the steady state roll angle $\phi_\infty$ and the other variables illustrated vary with time in such a manner as shown in FIG. 8. When the absolute value of $\phi$ is equal to or less than $\phi_1$, a decision of NO is made in the steps 7 and 11, and thereby the steps 20 through 26 are carried out as in the case of the above described forward running state in order to adjust the vehicle height Hi within the desired vehicle height range Hbi±ΔHo. In this case, in the periods where the absolute value of the difference $\hat{\phi}$ is equal to or less than $\phi_2$, the damping effect is controlled to be in the base mode and the spring rate is controlled to be set at low, while in the periods where the absolute value of the difference $\hat{\phi}$ is greater than $\phi_2$ but is less than $\phi$hd 1, the damping effect and the spring effect are adjusted to high.

In the event where the absolute value of $\hat{\phi}$ is greater than $\phi_1$, then decisions of YES are made in the steps 7 and 11; a modified value $\hat{\phi}_\infty$ of $\phi$ is calculated in the step 11a; the duty ratio Dli is calculated based upon this modified value $\hat{\phi}_s$ in the step 12; the sign of $\hat{\phi}$ is determined in the step 13; and then the flow of control proceeds to the step 16 by way of the step 14 in the event where $\hat{\phi}$ is less than zero, and by way of the step 15 in the event where $\hat{\phi}$ is greater than zero, and the vehicle height adjustment is performed to prevent the vehicle body from rolling, and the suspension damping effect and the spring rate are both maintained at high. In this case, the actual roll angle $\phi_t$ of the vehicle body gradually increases from zero due to the centrifugal force acting upon the vehicle body. Referring to the supplementary time chart of FIG. 10, since the absolute value of the modified value $\hat{\phi}_s$ of the roll angle difference is smaller than the absolute value of the difference $\hat{\phi}$ at a time point t11 when the actual roll angle $\phi_t$ becomes a determinate value $\phi_x$, and the absolute value of $\hat{\phi}_s$ reaches a maximum value at a time point t12 that is behind the time point t11, during the period between these time points the duty ratio of the electrical signal supplied to the flow control valves is smaller than that at the time point t12, and the absolute value of the actual roll angle $\phi_t$ is larger than the determinate value, and the actual roll angle produces a smooth curve around the time point t11.

In the connection it will be seen that, if the steering wheel is returned back toward the neutral position and the absolute value of $\phi$ becomes equal to or less than $\phi_1$, a decision of NO is made in the step 11 and the flow of program control returns to the normal vehicle height adjusting mode by the steps 20 to 25.

Thus, while the actual roll angle $\phi_t$ varies as shown by the one point chain line and by the two points chain line in FIG. 8 in the event where roll control by the vehicle height adjustment is not performed and in the event where only normal per se known vehicle height adjustment based upon the vehicle height difference is effected, respectively, on the other hand, with the second preferred embodiment of the vehicle roll control system of the present invention as described above and as shown in the drawings, the actual roll angle varies as shown by the solid line, and accordingly the vehicle body is very effectively prevented from rolling without any substantial time lag in response, as compared with the prior art. Although in the case where the modified value $\phi_s$ is not calcalated the actual roll angle $\phi_t$ of the vehicle body varies as shown by the broken lines in FIGS. 8 and 10, and the rate of change thereof changes rapidly around the time point t11, in the second preferred embodiment shown the actual roll angle $\phi_t$ varies smoothly, the thereby eliminate the possibility that the driver and/or the passengers in the vehicle will feel uneasiness or discomfort.

From the above description, it will be seen that according to the present invention a steady state roll angle $\phi_\infty$ of the vehicle body and a compensating value $\phi_\infty$ of roll angle are calculated from the vehicle speed V and the steering angle δ; the instantaneous value $\phi_t$ of roll angle of the vehicle body is calculated from the vehicle heights Hi; a roll angle difference $\phi$ is calculated from the desired roll angle $\phi_a$, the compensating value $\phi_\infty$, and the instantaneous value $\phi_t$; in the event when the absolute value of the roll angle difference $\phi$ is equal to or less than a first determinate value, the normal vehicle height adjustment is performed so that the vehicle height can be adjusted within the desired vehicle height range, and the hardness and softness characteristics of the suspension means are controlled in accordance with the roll angle difference so that the roll amount of the vehicle body is reduced in the periods when the roll amount is relatively small and yet the comfortability of the vehicle is enhanced; while, in the event when the absolute value of the roll angle difference exceeds the first determinate value, the modified value $\phi_s$ of the roll angle difference is calculated and the flow rate control valves are operated by electrical signals having duty ratios corresponding to this modified value, so that even in the event of rapid steering the roll control is accurately effected without any substantial time lag in response, whereby the vehicle body can be previously, positively, and precisely prevented from rolling and the possibility is eliminated that the vehicle driver and/or the passengers might feel uneasiness or discomfort due to any rapid change in the rate of change of the actual roll angle of the vehicle body.

Although, in the second preferred embodiment described above, the determination of the rolling direction in the step 13 was performed by determining the sign of the roll angle difference, this determination might alternatively be effected by determining the sign of the compensating value large of roll angle or of the modified value $\phi_s$. While, in this second preferred embodiment described above, an instantaneous value $\phi_t$ of roll angle of the vehicle body was determined by calculation from the vehicle heights Hi at locations corresponding to the respective vehicle wheels, in an alternative embodiment such an instantaneous value $\phi_t$ of vehicle body roll angle might alternatively be determined by a direct detection process with angular detecting devices such as gyroscopes or the like, or by calculation based upon the output of a lateral acceleration sensor or the like. It should yet further be noted that, although the damping effect and the spring rate were set to be at high for each wheel during turning, in the step 16, together with the adjustment of the vehicle height, the damping effect and the spring rate may be set at high only for the wheels on the radially outward side, and the damping effect may be controlled in the base mode and the spring rate may be set at low for the wheels on the radially inward side.

Furthermore, by replacing the actual roll angle $\phi_t$ with $\phi_{tf}$ and $\phi_{tr}$ in the equation (14), to calculate roll angle differences $\phi_f$ and $\phi_r$ on both the front vehicle wheel side and the rear vehicle wheel side, and performing the step 7 and the following steps on both the vehicle wheel sides, the system can be made workable even in the event where the roll rigidity of the vehicle body is relatively considerably different between the front vehicle wheels side and the rear vehicle wheels side, and the hardness and the softness characteristics of the suspension means may be individually controlled in a proper manner on both the front vehicle wheels side and the rear vehicle wheels side.

Yet further, it would be possible in a variant embodiment for a control to be provided in the passenger compartment for the driver to indicate which of a range of set values for $\phi_o$ he or she wished to utilize during vehicle operation, so that the roll control effected by the vehicle roll control system of the present invention would then conform to the operational tastes of the vehicle driver and/or the passengers in the vehicle.

Further, although in the embodiment shown the values k3 and k4 are non zero functions of $\phi$, it would alternatively be possible for them to be positive constants in said other regions. In the latter case, the modified value $\phi_s$ would vary as shown by a broken line in FIG. 10.

Although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. For a vehicle comprising a body and a plurality of wheels upon which it runs, a vehicle roll control system of vehicle height adjustment type, comprising:

a plurality of suspension means, one corresponding to each one of said vehicle wheels, for resiliently suspending said vehicle wheels from the vehicle body and being controllable to vary the hardness/softness characteristic of suspension of said vehicle wheels between at least two different hardness/softness characteristic levels including a harder characteristic level and a softer characteristic level, each said suspension means comprising an actuator assembly which has a pressure chamber and being adapted to increase or decrease the suspension height of its corresponding vehicle wheel as a result of the supplying or discharging of working fluid to or from said pressure chamber;

a plurality of working fluid supplying and discharging means, one corresponding to each said actuator assembly, which serve to supply working fluid to each said pressure chamber and to discharge working fluid from each said pressure chamber;

vehicle speed detecting means for sensing the road speed of the vehicle;

steering angle detecting means for sensing the steering angle of the vehicle;

means for sensing the actual roll angle $\phi_t$ of said vehicle body; and means for computing and control, which computes a steady state roll angle $\phi_\infty$ of the vehicle body from the vehicle speed sensed by said vehicle speed detecting means and the steering angle sensed by said steering angle detecting means, advances the phase of a signal indicative of said steady state roll angle $\phi_\infty$ to thereby compute a compensating value $\phi_\infty$, and then computes a difference value $\hat{\phi}$ based upon a desired roll angle $\phi_a$ of the vehicle body, said compensating value $\phi_\infty$, and said actual vehicle body roll angle $\phi_t$, according to the equation:

$$\hat{\phi} = \phi_a - (k_1 \phi_\infty + k_2 \phi_t)$$

where $k_1$ and $k_2$ are positive constants; said computing and control means being adapted to control said plurality of working fluid supplying and discharging means based upon said difference value $\hat{\phi}$ when the absolute value of said difference value $\hat{\phi}$ is larger than a first predetermined value $\phi_1$, and to control the hardness/softness characteristics of said plurality of vehicle wheels suspension means according to the absolute value of said difference value $\hat{\phi}$ when the absolute value of said difference value $\hat{\phi}$ is smaller than said first predetermined value $\phi_1$.

2. A system for vehicle roll control according to claim 1, wherein when the absolute value of said difference value $\hat{\phi}$ is larger than said first predetermined value $\phi_1$, said computing and control means controls said plurality of working fluid supplying and discharging means according to said difference value $\hat{\phi}$.

3. A system for vehicle roll control according to claim 2, wherein said computing and control means is adapted to control the hardness/softness characteristics of said vehicle wheels suspension means to said harder characteristic level when the absolute value of said difference $\hat{\phi}$ is not larger than said first predetermined value $\phi_1$ and is larger than a second predetermined value $\phi_2$ which is smaller than said first predetermined value $\phi_1$, and to control the hardness/softness characteristics of said vehicle wheels suspension means to said softer characteristic level when the absolute value of said difference $\hat{\phi}$ is smaller than said second predetermined value $\phi_2$.

4. A system for vehicle roll control according to claim 2 wherein said desired roll angle $\phi_a$ is zero.

5. A system for vehicle roll control according to claim 2 wherein said computing and control means comprises memory means, and said memory means stores a relationship between vehicle speeds, steering angles, and steady state roll angles.

6. A system for vehicle roll control according to claim 2 wherein said means for sensing the actual roll angle $\phi_t$ of said vehicle body is a plurality of vehicle height detecting means for sensing the vehicle heights at locations corresponding to the vehicle wheels, and said computing and control means is adapted to compute both a roll angle $\phi_f$ of said vehicle body with respect to the front vehicle wheels and also a roll angle $\phi_r$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to compute as said actual roll angle $\phi_t$ the average of said two roll angles $\phi_f$ and $\phi_r$.

7. A system for vehicle roll control according to claim 2, wherein said means for sensing the actual roll angle $\phi_t$ of said vehicle body is a plurality of vehicle height detecting means for sensing the vehicle heights at locations corresponding to the vehicle wheels, and said computing and control means is adapted to compute both a roll angle $\phi_{tf}$ of said vehicle body with respect to the front vehicle wheels and also a roll angle $\phi_{tr}$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to perform the computing of said roll angle difference value $\hat{\phi}$, the controlling of said plurality of working fluid supplying and discharging means, and the controlling of the hardness/softness characteristics of said suspension means individually for the front vehicle wheels and the rear vehicle wheels, based upon said two roll angles $\phi_{tf}$ and $\phi_{tr}$.

8. A system for vehicle roll control according to claim 1, wherein when the absolute value of said difference value $\hat{\phi}$ is larger than said first predetermined value $\phi_1$, said computing and control means calculates a modified value $\hat{\phi}_s$ of said difference value $\hat{\phi}$ according to the equations:

$$\hat{\phi}_s = k_3(\hat{\phi} - \phi_1) \ (\hat{\phi} > \phi_1)$$

$$\hat{\phi}_s = k_4(\hat{\phi} - \phi_1) \ (\hat{\phi} < -\phi_1)$$

where $k_3$ and $k_4$ are positive coefficients, and controls said plurality of working fluid supplying and discharging means according to said modified value $\hat{\phi}_s$.

9. A system for vehicle roll control according to claim 8, wherein said computing and control means is adapted to control the hardness/softness characteristics of said vehicle wheels suspension means to said harder characteristic level when the absolute value of said difference value $\hat{\phi}$ is not larger than said first predetermined value $\phi_1$ and is larger than a second predetermined value $\phi_2$ which is smaller than said first predetermined value $\phi_1$, and to control the hardness/softness characteristics of said vehicle wheels suspension means to said softer characteristic level when the absolute value of said difference value $\hat{\phi}$ is smaller than said second predetermined value $\phi_2$.

10. A system for vehicle roll control according to claim 8, wherein said desired roll angle $\phi_a$ is zero.

11. A system for vehicle roll control according to claim 8 wherein said computing and control means comprises memory means, and said memory means stores a relationship between vehicle speeds, steering angles, and steady state roll angles.

12. A system for vehicle roll control according to claim 8, wherein said means for sensing the actual $\phi_t$ roll angle of said vehicle body is a plurality of vehicle height detecting means for sensing the vehicle heights at locations corresponding to the vehicle wheels, and said computing and control means is adapted to compute both a roll angle $\phi_f$ of said vehicle body with respect to the front vehicle wheels and also a roll angle $\phi_r$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to compute as an actual roll angle $\phi_t$ the average of said two roll angles $\phi_f$ and $\phi_r$.

13. A system for vehicle roll control according to claim 8, wherein said means for sensing the actual roll angle $\phi_t$ of said vehicle body is a plurality of vehicle height detecting means for sensing the vehicle heights at locations corresponding to the vehicle wheels, and said computing and control means is adapted to compute both a roll angle $\phi_{tf}$ of said vehicle body with respect to the front vehicle wheels and also a roll angle $\phi_{tr}$ tr of said vehicle body with respect to the rear vehicle wheels from vehicle height differences between the lift and the right sides of said vehicle body based upon the vehicle heights sensed by said vehicle height detecting means and the distances between the left and the right vehicle wheels, and to perform the computing of said roll angle difference value $\hat{\phi}$, the controlling of said plurality of working fluid supplying and discharging means, and the controlling of the hardness/softness characteristics of said suspension means individually for the front vehicle wheels and the rear vehicle wheels, based upon said two roll angles $\phi_{tf}$ and $\phi_{tr}$.

14. For a vehicle comprising a body and a plurality of wheels upon which it runs, a vehicle roll control system of vehicle height adjustment type, comprising:

a plurality of suspension means, one corresponding to each one of said vehicle wheels, for resiliently suspending said vehicle wheels from the vehicle body and being controllable to vary the hardness/softness characteristic of suspension of said vehicle wheels between at least two different hardness/softness characteristic levels including a harder characteristic level and a softer characteristic level, each said suspension means comprising an actuator assembly which has a pressure chamber and being adapted to increase or decrease the suspension height of its corresponding vehicle wheel as a result of the supplying or discharging of working fluid to or from said pressure chamber;

a plurality of working fluid supplying and discharging means, one corresponding to each said actuator assembly, which serve to supply working fluid to each said pressure chamber and to discharge working fluid from each said pressure chamber;

a plurality of vehicle height detection means, one corresponding to each of said vehicle wheels, which serve to sense parameters representative of the suspended heights Hi of the vehicle body over said vehicle wheels;

vehicle speed detecting means for sensing the road speed of the vehicle;

steering angle detecting means for sensing the steering angle of the vehicle;

means for sensing the actual roll angle $\phi_t$ of said vehicle body; and means for computing and control, which computes the differences $\Delta$ Hi between said vehicle heights Hi as sensed by said plurality of vehicle height detection means and reference vehicle heights, computes a steady state roll angle $\phi_\infty$ of the vehicle body from the vehicle speed sensed by said vehicle speed detecting means and the steering angle sensed by said steering angle detecting means, advances the phase of a signal indicative of said steady state roll angle $\phi_\infty$ to thereby compute a compensating value $\Phi_\infty$, and then computes a difference value $\hat{\phi}$ based upon a desired roll angle $\phi_a$ of the vehicle body, said compensating value $\Phi_\infty$, and said actual vehicle body roll angle $\phi_t$, according to the equation:

$$\hat{\phi}=\phi_a-(k_1\Phi_\infty+k_2\phi_t)$$

where $k_1$ and $k_2$ are positive constants; said computing and control means being adapted, when the absolute value of said difference value $\hat{\phi}$ is larger than a first predetermined value $\phi_1$, to control said plurality of working fluid supplying and discharging means based upon said difference value $\hat{\phi}$, and when the absolute value of said difference value $\hat{\phi}$ is smaller than said first predetermined value $\hat{\phi}_1$, to control said plurality of working fluid supplying and discharging means according to said vehicle height differences $\Delta$Hi so as to thereby adjust the absolute values of said vehicle height differences to be not more than a predetermined value $\Delta$Ho, and to control the hardness/softness characteristics of said vehicle wheels suspension means according to the absolute value of said difference value $\hat{\phi}$.

15. A system for vehicle roll control according to claim 14, wherein when the absolute value of said difference value $\hat{\phi}$ is larger than said first predetermined value $\phi_1$, said computing and control means controls said working fluid supplying and discharging means according to said difference value $\hat{\phi}$.

16. A system for vehicle roll control according to claim 15, wherein said computing and control means is adapted to control the hardness/softness characteristics of said vehicle wheels suspension means to said harder characteristic level when the absolute value of said difference $\hat{\phi}$ is not larger than said first predetermined value $\phi_1$ and is larger than a second predetermined value $\phi_2$ which is smaller than said first predetermined value $\phi_1$, and to control the hardness/softness characteristics of said vehicle wheels suspension means to said softer characteristic level when the absolute value of said difference $\hat{\phi}$ is smaller than said second predetermined value $\phi_2$.

17. A system for vehicle roll control according to claim 15, wherein said desired roll angle $\phi_a$ is zero.

18. A system for vehicle roll control according to claim 15, wherein said computing and control means comprises memory means, and said memory means stores a relationship between vehicle speeds, steering angles, and steady state roll angles.

19. A system for vehicle roll control according to claim 15, wherein said means for sensing the actual roll angle $\phi_t$ of said vehicle body is a plurality of vehicle height detecting means for sensing the vehicle heights at locations corresponding to the vehicle wheels, and said computing and control means is adapted to compute both a roll angle $\phi_f$ of said vehicle body with respect to the front vehicle wheels and also a roll angle $\phi_r$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to compute as said actual roll angle $\phi_t$ the average of said two roll angles $\phi_f$ and $\phi_r$.

20. A system for vehicle roll control according to claim 15, wherein said means for sensing the actual roll angle $\phi_f$ of said vehicle body is a plurality of vehicle height detecting means for sensing the vehicle heights at locations corresponding to the vehicle wheels, and said computing and control means is adapted to compute both a roll angle $\phi_{tf}$ of said vehicle body with respect to the front vehicle wheels and also a roll angle $\phi_{tr}$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to perform the computing of said roll angle difference value $\hat{\phi}$, the controlling of said working fluid supplying and discharging means, and the controlling of the hardness/softness characteristics of said suspension means individually for the front vehicle wheels and the rear vehicle wheels, based upon said two roll angles $\phi_{rf}$ and $\phi_{tr}$.

21. A system for vehicle roll control according to claim 15, wherein said predetermined value $\Delta H_o$ for said vehicle height differences $\Delta H_i$ is not larger than the absolute values of said vehicle height differences $\Delta H_i$ at the time when the absolute value of said roll angle difference value $\hat{\phi}$ is equal to said first predetermined value $\phi_\infty$.

22. A system for vehicle roll control according to claim 14, wherein when the absolute value of said difference value $\hat{\phi}$ is larger than said first predetermined value $\phi_1$, said computing and control means calculates a modified value $\hat{\phi}_s$ of said difference value $\hat{\phi}$ according to the equations:

$$\hat{\phi}_s = k_3(\hat{\phi} - \phi_1) \ (\hat{\phi} > \phi_1)$$

$$\hat{\phi}_s = k_4(\hat{\phi} - \phi_1) \ (\hat{\phi} < -\phi_1)$$

where $k_3$ and $k_4$ are positive coefficients, and controls said plurality of working fluid supplying and discharging means according to said modified value $\hat{\phi}_s$.

23. A system for vehicle roll control according to claim 22, wherein said computing and control means is adapted to control the hardness/softness characteristics of said vehicle wheels suspension means to said harder characteristic level when the absolute value of said value difference $\hat{\phi}$ is not larger than said first predetermined value $\phi_1$ and is larger than a second predetermined value $\phi_2$ which is smaller than said first predetermined value $\phi_1$, and to control the hardness/softness characteristics of said vehicle wheels suspension means to said softer characteristic level when the absolute value of said difference value $\hat{\phi}$ is smaller than said second predetermined value $\phi_2$.

24. A system for vehicle roll control according to claim 22, wherein said desired roll angle $\phi_a$ is zero.

25. A system for vehicle roll control according to claim 22, wherein said computing and control means comprises memory means, and said memory means stores a relationship between vehicle speeds, steering angles, and steady state roll angles.

26. A system for vehicle roll control according to claim 22, wherein said means for sensing the actual roll angle $\phi_t$ of said vehicle body is a plurality of vehicle height detecting means for sensing the vehicle heights at locations corresponding to the vehicle wheels, and said computing and control means is adapted to compute both a roll angle $\phi_f$ of said vehicle body with respect to the front vehicle wheels and also a roll angle $\phi_r$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to compute as an actual roll angle $\phi_t$ the average of said two roll angles $\phi_f$ and $\phi_r$.

27. A system for vehicle roll control according to claim 22, wherein said means for sensing the actual roll angle $\phi_t$ of said vehicle body is a plurality of vehicle height detecting means for sensing the vehicle heights at locations corresponding to the vehicle wheels, and said computing and control means is adapted to compute both a roll angle $\phi_{tf}$ of said vehicle body with respect to the front vehicle wheels and also a roll angle $\phi_{tr}$ of said vehicle body with respect to the rear vehicle wheels from vehicle height differences between the left and the right sides of said vehicle body based upon the vehicle heights sensed by said vehicle height detecting means and the distances between the left and the right vehicle wheels, and to perform the computing of said roll angle difference value $\hat{\phi}$, the controlling of said plurality of working fluid supplying and discharging means, and the controlling of the hardness/softness characteristics of said suspension means individually for the front vehicle wheels and the rear vehicle wheels, based upon said two roll angles $\phi_{tf}$ and $\phi_{tr}$.

28. A system for vehicle roll control according to claim 22, wherein said predetermined value $\Delta H_o$ for said vehicle height differences $\Delta H_i$ is not larger than the absolute values of said vehicle height differences $H_i$ at the time when the absolute value of said roll angle difference value $\hat{\phi}$ is equal to said first predetermined value $\phi_1$.

* * * * *